(12) United States Patent
Katori

(10) Patent No.: US 9,497,621 B2
(45) Date of Patent: Nov. 15, 2016

(54) COMMUNICATION SYSTEM

(71) Applicant: FUJITSU LIMITED, Kawasaki-shi, Kanagawa (JP)

(72) Inventor: Masato Katori, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 14/720,135

(22) Filed: May 22, 2015

(65) Prior Publication Data
US 2015/0358811 A1 Dec. 10, 2015

(30) Foreign Application Priority Data
Jun. 10, 2014 (JP) .................. 2014-119940

(51) Int. Cl.
*H04W 4/00* (2009.01)
*H04W 8/26* (2009.01)

(52) U.S. Cl.
CPC ...................... *H04W 8/26* (2013.01)

(58) Field of Classification Search
CPC . H04L 5/0053; H04L 5/0048; H04L 1/1854; H04L 5/0035; H04W 72/04; H04W 16/24; H04B 7/0452; H04B 7/0617
USPC ........... 455/422.1, 437, 456.1; 370/225, 252, 370/254, 329, 297, 316, 331
See application file for complete search history.

(56) References Cited

U.S. PATENT DOCUMENTS

| 2012/0140660 A1* | 6/2012 | Kang ................ H04L 1/0077 370/252 |
| 2012/0263128 A1 | 10/2012 | Hu et al. |
| 2014/0192775 A1* | 7/2014 | Li .................. H04W 36/0072 370/331 |
| 2015/0280804 A1* | 10/2015 | Melzer ............. H04B 7/0626 375/316 |

FOREIGN PATENT DOCUMENTS

| JP | 2013-509055 | 3/2013 |
| WO | 2011047619 | 4/2011 |

* cited by examiner

*Primary Examiner* — Dhaval Patel
(74) *Attorney, Agent, or Firm* — Fujitsu Patent Center

(57) ABSTRACT

The base station includes a first assigning unit and a second assigning unit. The first assigning unit, in execution of first communication using a single cell of the base station with the terminal, assigns, to the terminal, a first identification number as an identification number associated uniquely with the single cell from a predetermined number of identification numbers for identifying terminals. The second assigning unit, in execution of second communication simultaneously using a plurality of cells with the terminal, assigns, to the terminal, a second identification number as an identification number associated commonly with the plurality of the cells from the predetermined number of the identification numbers excluding the first identification number. The terminal includes a communication control unit. The communication control unit performs the first communication or the second communication by using the first identification number or the second identification number assigned by the base station.

8 Claims, 19 Drawing Sheets

FIG.7

| C-RNTI NUMBER | ASSIGNMENT STATUS |
|---|---|
| 000001 | IN USE |
| 000002 | FREE |
| 000003 | IN USE |
| 000004 | FREE |
| 000005 | FREE |
| 000006 | FREE |
| ... | ... |
| ... | ... |
| 023400 | IN USE |
| 023401 | FREE |
| 023402 | NOT FOR USE |
| 023403 | NOT FOR USE |
| ... | ... |
| ... | ... |
| 065531 | NOT FOR USE |
| 065532 | NOT FOR USE |
| 065533 | NOT FOR USE |
| 065534 | NOT FOR USE |
| 065535 | NOT FOR USE |

| C-RNTI NUMBER | ASSIGNMENT STATUS |
|---|---|
| 000001 | NOT FOR USE |
| 000002 | NOT FOR USE |
| 000003 | NOT FOR USE |
| 000004 | NOT FOR USE |
| 000005 | NOT FOR USE |
| 000006 | NOT FOR USE |
| ... | ... |
| ... | ... |
| 023400 | NOT FOR USE |
| 023401 | NOT FOR USE |
| 023402 | FREE |
| 023403 | IN USE |
| ... | ... |
| ... | ... |
| 065531 | FREE |
| 065532 | IN USE |
| 065533 | FREE |
| 065534 | FREE |
| 065535 | IN USE |

COMMUNICATION SYSTEM

CROSS-REFERENCE TO RELATED APPLICATION

This application is based upon and claims the benefit of priority of the prior Japanese Patent Application No. 2014-119940, filed on Jun. 10, 2014, the entire contents of which are incorporated herein by reference.

FIELD

The embodiments discussed herein are directed to a communication system and a base station.

BACKGROUND

In 3rd Generation Partnership Project Radio Access Network Long Term Evolution (3GPP LTE)-Advanced, a technology called Carrier Aggregation (CA) has been studied in order to increase bandwidth. CA is a communication technology that enables a plurality of different frequency bands to be used. A communication area where communication is performed by using a single frequency band is referred to as a cell. Therefore, CA may be described as a communication technology for simultaneously using two or more of all the cells of a base station.

When CA is performed, a single terminal belongs to two or more of all the cells of a base station. In this case, the base station assigns, to the terminal, an identification number common to the two or more cells from a predetermined number of identification numbers for identifying terminals. Then, the terminal performs communication using the two or more cells by using the identification number assigned by the base station. In 3GPP, the identification number for identifying a terminal is referred to as a Cell-Radio Network Temporary Identifier (C-RNTI) number. A range of the C-RNTI numbers defined by 3GPP is from 1 to 65535. Patent Literature 1 is an example of a document that proposes a technology for assigning a C-RNTI at the time of CA.

Patent Literature 1: Japanese National Publication of International Patent Application No. 2013-509055

When communication other than CA is performed, a single terminal belongs to any of all the cells of a base station. The base station assigns an arbitrary C-RNTI number to the terminal from the predetermined number of C-RNTI numbers. The arbitrary C-RNTI number is assigned independently for each cell. Therefore, when CA is performed after communication other than CA, C-RNTI numbers assigned to the terminal may conflict with each other.

In this regard, to prevent the C-RNTI numbers from overlapping between all the cells of a base station, it may be possible to divide the predetermined number of C-RNTIs for each of the cells, shift the ranges of the divided C-RNTIs among the cells, and fix the ranges of the C-RNTIs corresponding to the respective cells. However, in this method, the range of the C-RNTI numbers for each of the cells is fixed, so that the C-RNTI numbers for each of the cells may be insufficient depending on the total number of the cells of the base station. As a result, the C-RNTI numbers to be assigned to terminals may be depleted. The depletion of the C-RNTI numbers in the method of fixing the range of the C-RNTIs corresponding to each of the cells may occur based on underlying assumptions as follows:

- a functional unit that assigns a C-RNTI number is provided in each cell;
- an assigning unit in each cell assigns a C-RNTI number within the range of divided C-RNTI numbers; and
- a C-RNTI number assigned in each cell is also used in the same manner when communication using other cells is performed with implementation of CA.

SUMMARY

According to an aspect of an embodiment, a communication system includes a base station; and a terminal, wherein the base station includes: a first assigning unit that, in execution of first communication using a single cell of the base station with the terminal, assigns, to the terminal, a first identification number as an identification number associated uniquely with the single cell from a predetermined number of identification numbers for identifying terminals; and a second assigning unit that, in execution of second communication simultaneously using a plurality of cells with the terminal, assigns, to the terminal, a second identification number as an identification number associated commonly with the plurality of the cells from the predetermined number of the identification numbers excluding the first identification number, and the terminal includes: a communication control unit that performs the first communication by using the first identification number assigned by the base station, or performs the second communication by using the second identification number assigned by the base station.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 7 is a diagram illustrating an example of a C-number storage unit for storing a group of C-numbers for non-CA;

DESCRIPTION OF EMBODIMENTS

Preferred Embodiments of the Present Invention will be explained with reference to accompanying drawings. The disclosed technology is not limited to the embodiments below.

[a] First Embodiment

Figure 1:
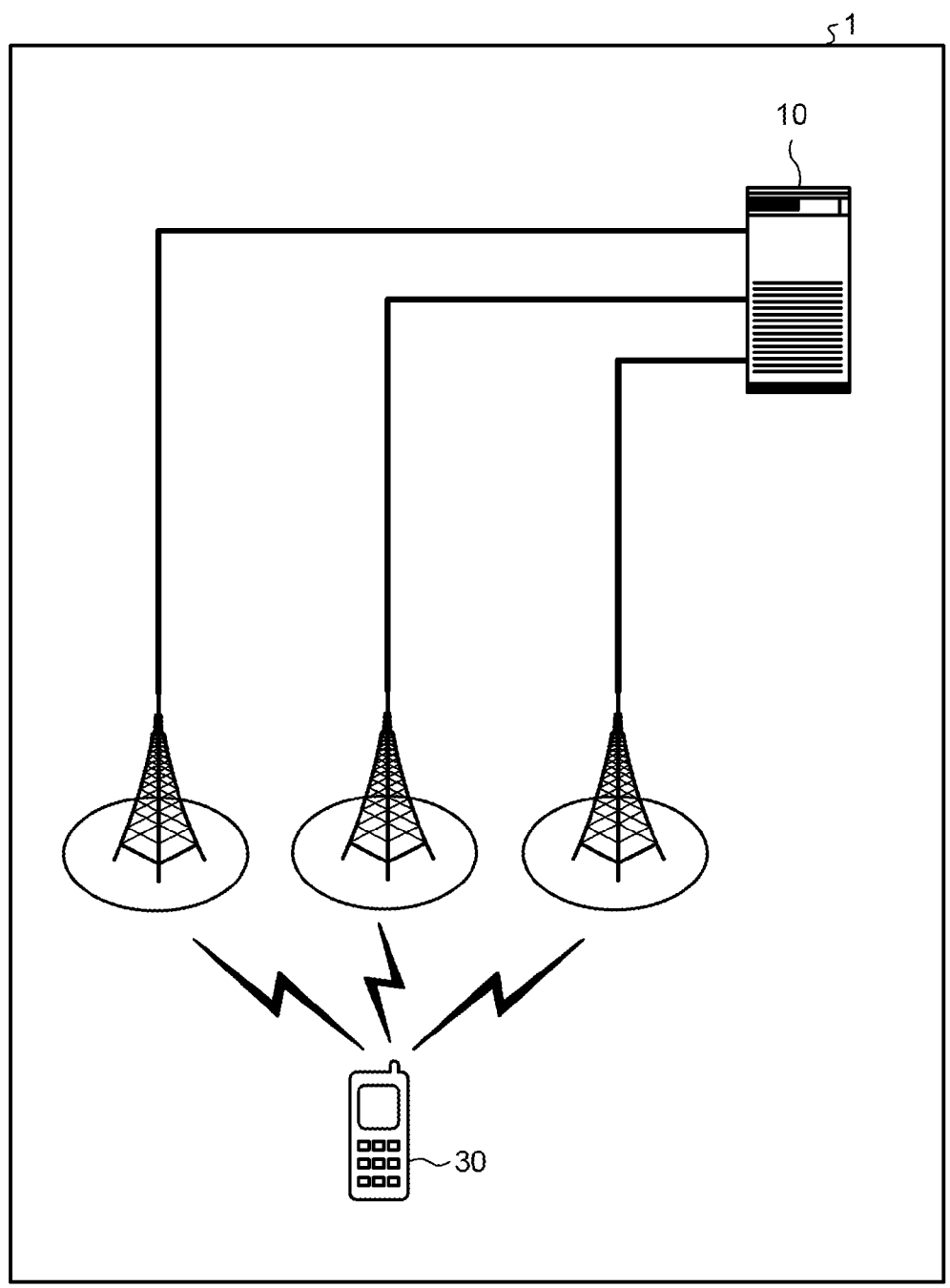
FIG. 1 is a diagram illustrating an example of a communication system according to a first embodiment.

FIG. 1 is a diagram illustrating an example of a communication system of a first embodiment. Hereinafter, a system configuration of the communication system of the first embodiment will be described in accordance with a communication system employing LTE and LTE-Advanced that are communication standards of 3GPP, unless otherwise specified. However, the communication system disclosed in the present application is applicable to communication systems other than the communication system employing LTE and LTE-Advanced.

As illustrated in FIG. 1, a communication system 1 includes a base station 10 and a terminal 30. When the terminal 30 belongs to any of all the cells of the base station 10, the terminal 30 performs communication by using the single cell. Meanwhile, the terminal 30 performs communication by simultaneously using two or more of all the cells of the base station 10. In LTE-Advanced, communication simultaneously using two or more cells is referred to as "Carrier Aggregation (CA)". Therefore, hereinafter, communication simultaneously using two or more cells is referred to as "CA communication", and communication using a single cell is referred to as "non-CA communication". The non-CA communication and the CA communication are examples of a first communication and a second communication, respectively. Further, a "cell" is a communication area where communication is performed by using a single frequency band. In FIG. 1, three cells are illustrated by way of example.

The base station 10, in execution of communication with the terminal 30, assigns, to the terminal 30, any of a predetermined number of C-RNTI numbers (hereinafter, appropriately referred to as "C-numbers") as an identification number for identifying the terminal 30. A range of the C-numbers defined by 3GPP is from 1 to 65535.

Figure 2:
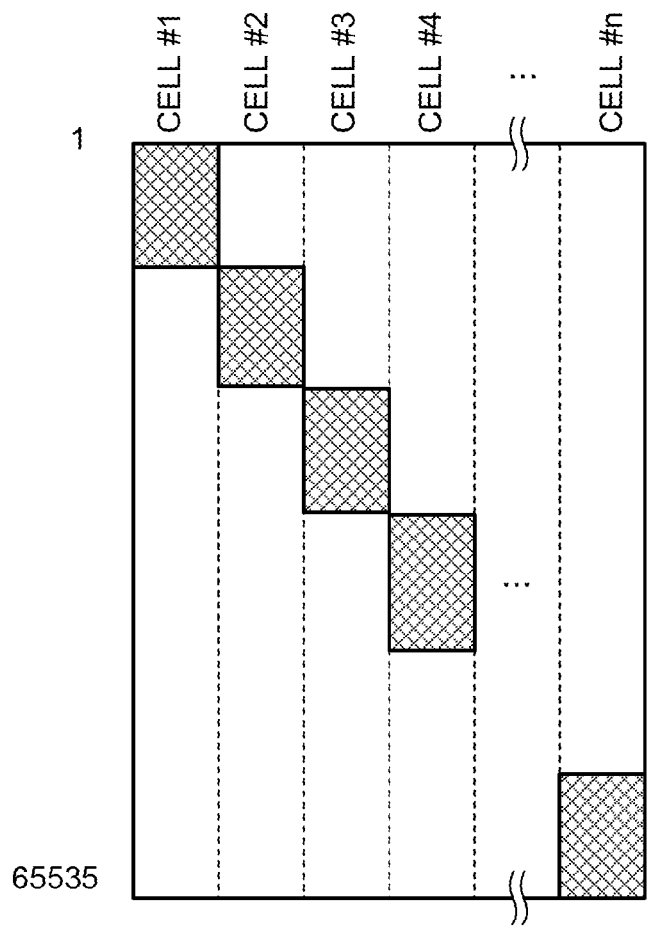
FIG. 2 is a diagram for explaining a C-number assigning method as a basis for the first embodiment.

In the following, a C-number assigning method as a basis for the first embodiment will be described first, and explanation of a C-number assigning method of the first embodiment follows. FIG. 2 is a diagram for explaining the C-number assigning method as the basis for the first embodiment.

In the C-number assigning method as the basis for the first embodiment, the C-numbers of 1 to 65535 are divided for each cell, and the ranges of the divided C-numbers are shifted among the cells in order to prevent the C-numbers to be assigned from overlapping between all of the cells of a base station. Namely, in the C-number assigning method as the basis for the first embodiment, the range of the C-numbers corresponding to each cell is fixed. In the example in FIG. 2, the C-numbers of 1 to 65535 are divided by a total number n (n is an integer equal to or greater than 2) of the cells, and n ranges of the C-numbers are shifted among the cells so that the ranges of the C-numbers corresponding to the respective cells #1 to #n are fixed. Further, in the C-number assigning method as the basis for the first embodiment, the base station assigns an arbitrary C-number within the range of the C-numbers fixed for each cell. Therefore, even when CA communication is performed after non-CA communication, it is possible to prevent conflict between the C-numbers to be assigned to a terminal.

A reason to assign a C-number for each cell in the C-number assigning method as the basis for the first embodiment will be described below. This is because a time to return a response of a Message 2 after reception of a Message 1 is determined by standardization, and in some cases, a C-number storage unit may be provided in a BB function unit from the viewpoint of the processing capability of a device.

A problem with the C-number assigning method illustrated in FIG. 2 will be described. In the C-number assigning method illustrated in FIG. 2, the range of the C-numbers for each cell is fixed; therefore, the C-numbers for each cell may be insufficient depending on the total number of cells of a base station. As a result, the C-numbers to be assigned to terminals may be depleted when CA communication is performed.

Figure 3:
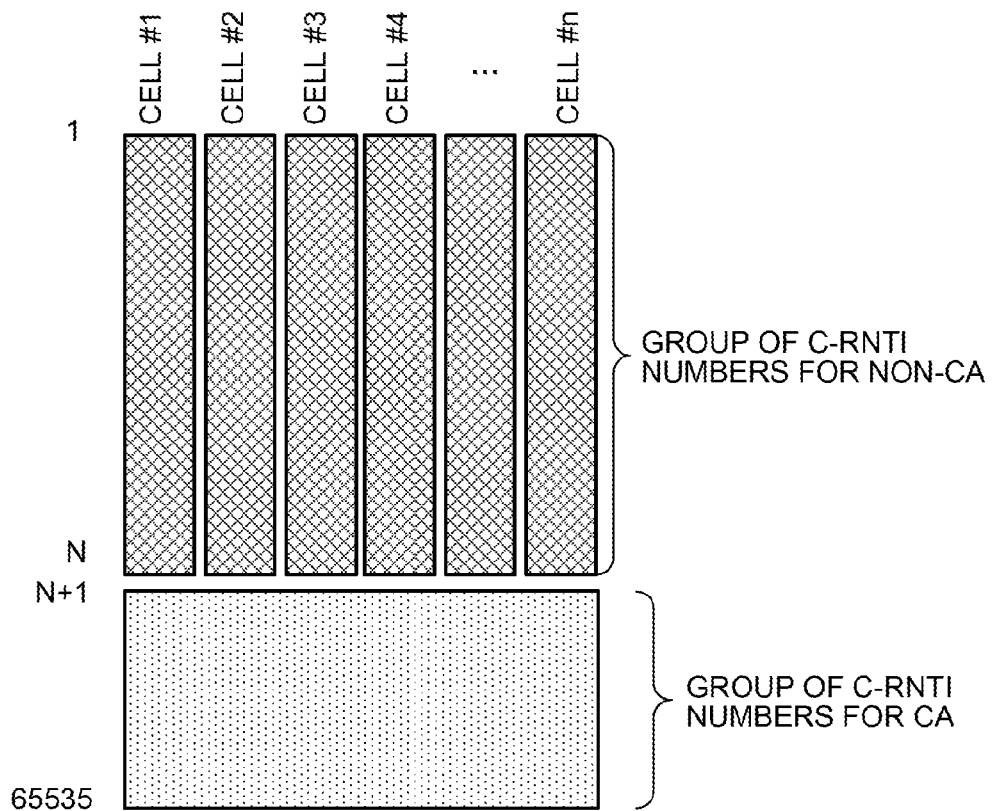
FIG. 3 is a diagram for explaining a C-number assigning method of the first embodiment.

In contrast, a C-number assigning method of the first embodiment will be described. FIG. 3 is a diagram for explaining the C-number assigning method of the first embodiment. In the C-number assigning method of the first embodiment, a predetermined number of C-numbers are divided, in advance, into a group of C-numbers for non-CA including C-numbers unique to the respective cells of the base station 10, and a group of C-numbers for CA including a C-number common to two or more of all the cells of the base station 10. In the example in FIG. 3, the C-numbers of 1 to 65535 are divided, in advance, into a group of C-numbers for non-CA including C-numbers of 1 to N (N is an integer equal to or greater than 2) and a group of C-numbers for CA including C-numbers of N+1 to 65535. The value of N is appropriately adjustable depending on actual operation.

In the C-number assigning method of the first embodiment, in execution of non-CA communication with the terminal 30, the base station 10 assigns, to the terminal 30, a C-number unique to each of the cells (hereinafter, referred to as a "C-number for non-CA") from the predetermined number of C-numbers. It is sufficient that the C-number for non-CA is unique to each of the cells. Therefore, a C-number for non-CA corresponding to a certain cell and a C-number for non-CA corresponding to a different cell may be the same or different from each other. In the example in FIG. 3, in execution of non-CA communication, the base station 10 assigns a C-number for non-CA to the terminal 30 from the group of C-numbers for non-CA among the predetermined number of C-numbers.

In contrast, in execution of CA communication with the terminal 30, the base station 10 assigns, to the terminal 30, a C-number common to two or more cells (hereinafter, referred to as a "C-number for CA") from the predetermined number of C-numbers excluding the C-numbers for non-CA. The C-number for CA is a C-number common to the two or more cells; therefore, the C-number for CA corresponding to a certain cell and the C-number for CA corresponding to a different cell are the same. In the example in FIG. 3, in execution of CA communication, the base station 10 assigns a C-number for CA to the terminal 30 from the group of C-numbers for CA among the predetermined number of C-numbers.

As described above, in the C-number assigning method of the first embodiment, in execution of CA communication, the base station 10 assigns a C-number for CA to the terminal 30 from the predetermined number of C-numbers excluding the C-numbers for non-CA. Therefore, according to the first embodiment, as compared to the underlying technology to fix the range of the C-numbers for each cell, it is possible to dynamically distinguish between the C-numbers for non-CA and the C-numbers for CA among the predetermined number of C-numbers, so that it is possible to efficiently prevent deficiency in the C-numbers for each cell. As a result, according to the first embodiment, it is possible to prevent depletion of the C-numbers to be assigned to the terminal 30 when CA communication is performed.

Figure 4:
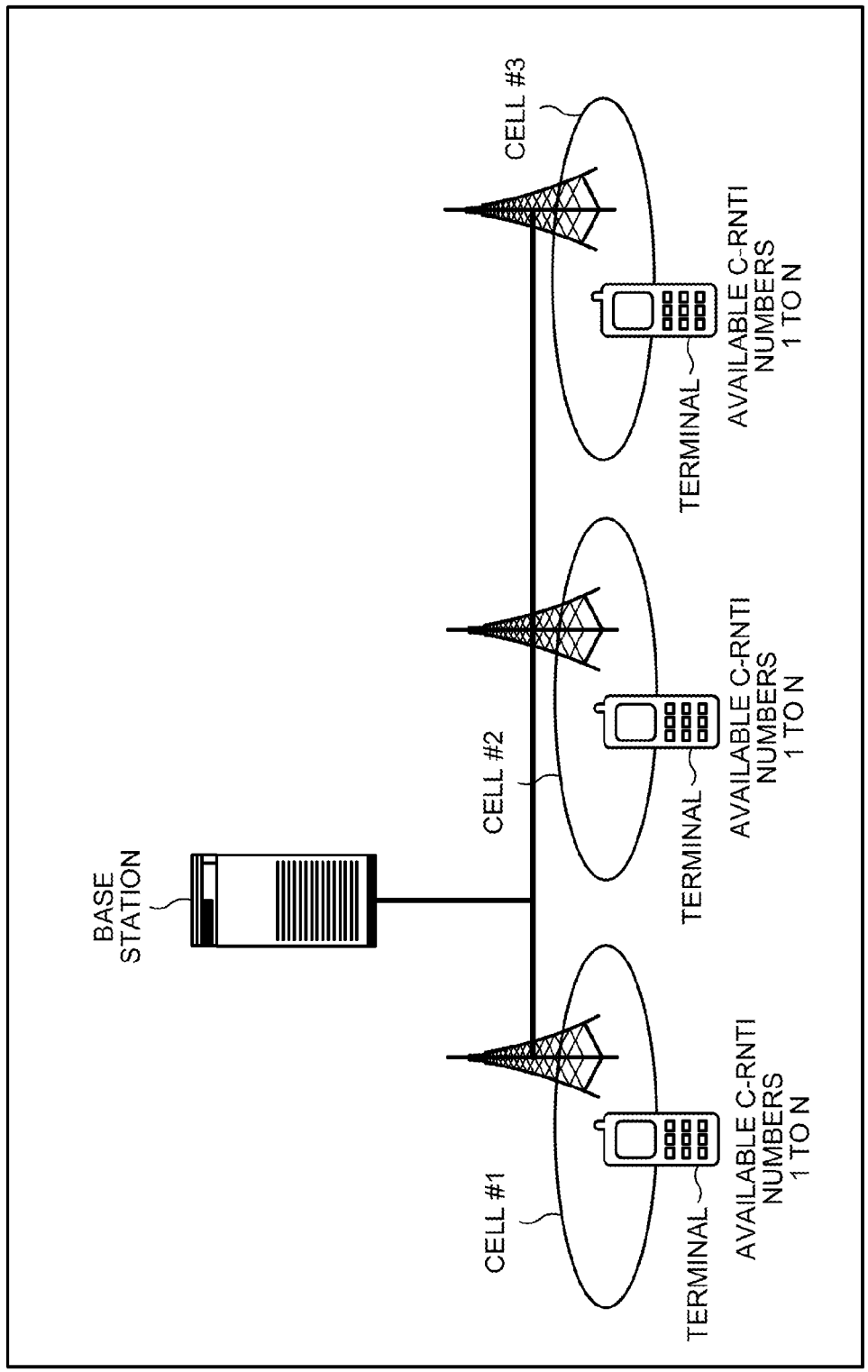
FIG. 4 is a diagram illustrating an example of assignment of C-numbers for non-CA when non-CA communication is performed according to the first embodiment.
Figure 5:
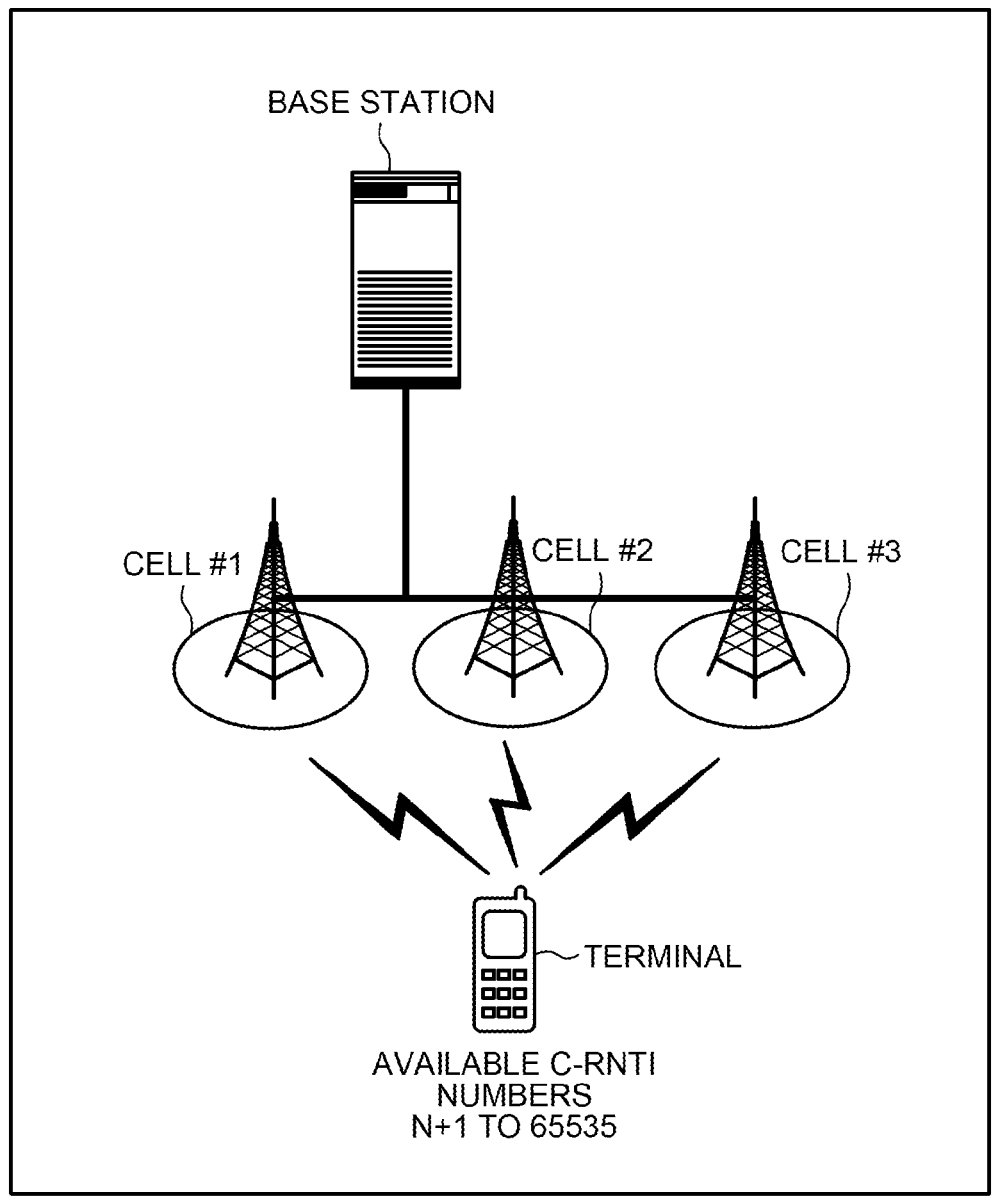
FIG. 5 is a diagram illustrating an example of assignment of C-numbers for CA when CA communication is performed according to the first embodiment.

FIG. 4 is a diagram illustrating an example of assignment of the C-numbers for non-CA when non-CA communication is performed according to the first embodiment. FIG. 5 is a diagram illustrating an example of assignment of the C-numbers for CA when CA communication is performed according to the first embodiment. In FIG. 4 and FIG. 5, a "base station" corresponds to the base station 10 illustrated in FIG. 1, and a "terminal" corresponds to the terminal 30 illustrated in FIG. 1.

In execution of non-CA communication with a terminal, as illustrated in FIG. 4, the base station assigns a C-number for non-CA to the terminal from the group of C-numbers for non-CA including the C-numbers of 1 to N. For example, it is assumed that 100 terminals perform non-CA communication in each of the cells #1 to #3. In this case, the number of C-numbers to be assigned to the terminals from the base station in each of the cells #1 to #3 is 100. In other words, 100 (N=100)C-numbers are adequate as the C-numbers for non-CA to be assigned to the terminals from the group of C-numbers for non-CA.

In contrast, in execution of CA communication with a terminal, as illustrated in FIG. 5, the base station assigns a C-number for CA to the terminal from the group of C-numbers for CA including the C-numbers of N+1 to 65535. For example, it is assumed that 100 terminals perform CA communication by simultaneously using the cells #1 to #3. In this case, the number of C-numbers that are common to the cells #1 to #3 and that are to be assigned to the terminals from the base station is 100. In other words, 100 (N=65435) C-numbers are adequate as the C-numbers for CA to be assigned to the terminals from the group of C-numbers for CA.

Figure 6:
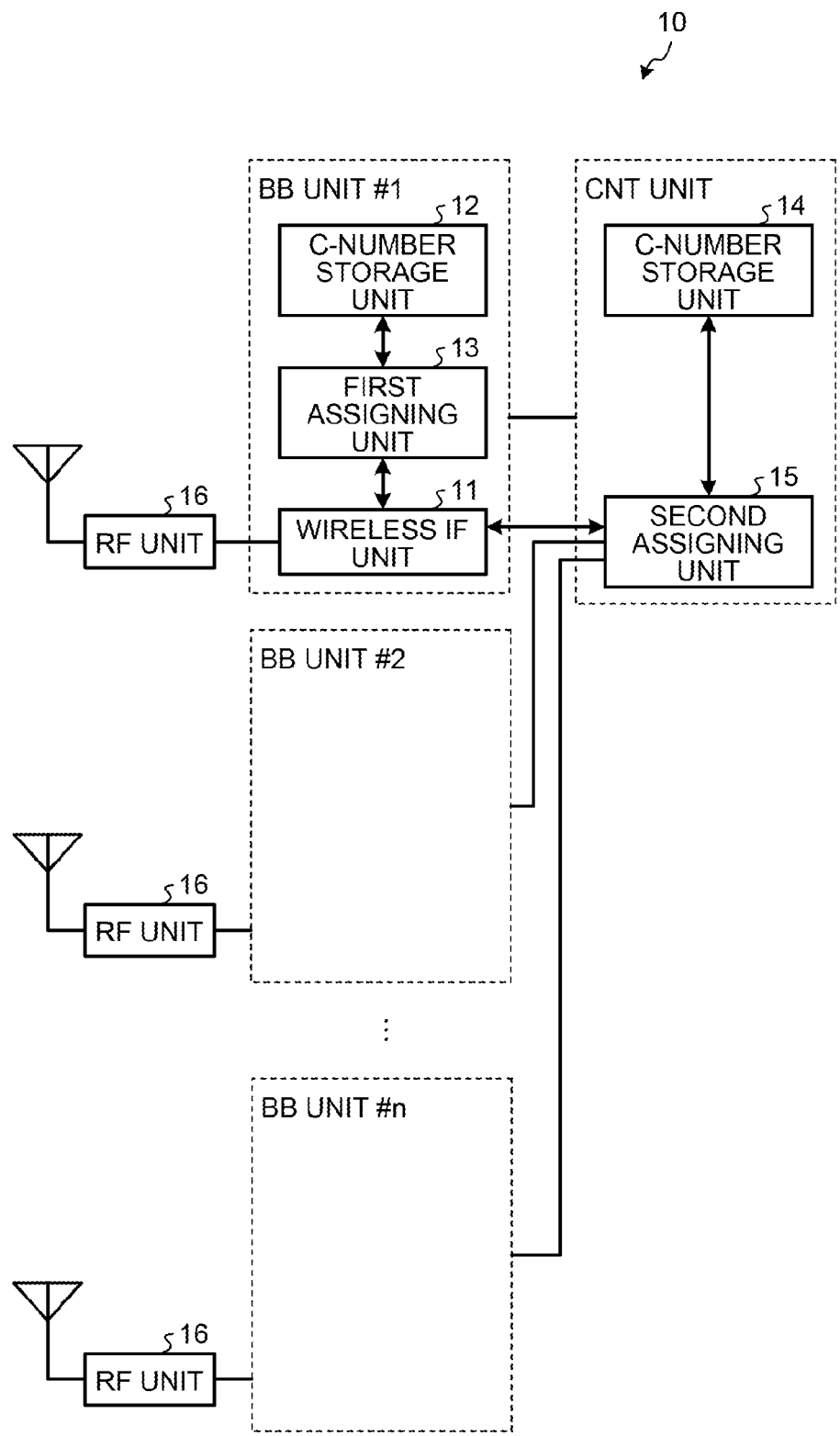
FIG. 6 is a functional block diagram illustrating a configuration example of a base station of the first embodiment.

Next, a configuration example of the base station 10 of the first embodiment will be described. FIG. 6 is a functional block diagram illustrating a configuration example of the base station of the first embodiment. As illustrated in FIG. 6, the base station 10 includes a wireless InterFace (IF) unit 11, a C-number storage unit 12, a first assigning unit 13, a C-number storage unit 14, a second assigning unit 15, and a Radio Equipment (RE) unit 16. The wireless IF unit 11, the C-number storage unit 12, and the first assigning unit 13 may be configured as a single BaseBand (BB) unit, and the C-number storage unit 14 and the second assigning unit 15 may be configured as a call processing CoNTroller (CNT) unit.

The number of some parts of the BB unit or the number of the entire BB units may be plural depending on the mode of CA. In the example in FIG. 6, BB units #1 to #n are provided as n BB units. Further, for example, in execution of CA communication by simultaneously using at least two different cells, it may be possible to provide a plurality of BB units corresponding to the cells to be used simultaneously. Furthermore, as illustrated in FIG. 6, the base station 10 may include a plurality of sets of the BB unit, and each set may correspond to each cell.

The wireless IF unit 11 performs a predetermined wireless reception process on signals received via an antenna, and outputs the signals to the first assigning unit 13 and the second assigning unit 15. For example, in execution of non-CA communication, the wireless IF unit 11 performs the predetermined wireless reception process on various Messages that are received through a random access procedure, and outputs the Messages to the first assigning unit 13 and the second assigning unit 15. Examples of the various Messages received through the random access procedure include the Message 1 containing a C-number request to request a C-number from the terminal 30 to the base station 10.

Further, the wireless IF unit 11 performs a predetermined wireless transmission process on signals received from the first assigning unit 13 and the second assigning unit 15, and transmits the signals via the antenna. For example, in execution of non-CA communication, the wireless IF unit 11 performs the predetermined wireless transmission process on various Messages that are transmitted through the random access procedure, and transmits the Messages via the antenna. Examples of the various Messages transmitted through the random access procedure include a Message 2 containing a C-number that is assigned by the base station 10 in response to a request from the terminal 30.

The C-number storage unit 12 stores therein the group of C-numbers for non-CA including the C-numbers of 1 to N for non-CA. FIG. 7 is a diagram illustrating an example of the C-number storage unit for storing the group of C-numbers for non-CA. As illustrated in FIG. 7, the C-number storage unit 12 stores therein a "C-RNTI number" and an "assignment status" in an associated manner.

The "C-RNTI number" indicates the C-numbers of 1 to N for non-CA included in the group of C-numbers for non-CA. The "assignment status" indicates whether each of the C-numbers for non-CA is currently assigned. In the "assignment status", "in use" indicates that a C-number for non-CA is currently assigned, "free" indicates that a C-number for non-CA is not assigned, and "not for use" indicates that assignment of a C-number for non-CA is prohibited. FIG. 7 illustrates an example in which N=023401.

In execution of non-CA communication, the first assigning unit 13 selects an arbitrary C-number for non-CA from the group of C-numbers for non-CA stored in the C-number storage unit 12, and assigns the selected C-number for non-CA to the terminal 30 via the wireless IF unit 11.

Figures 8, 9:
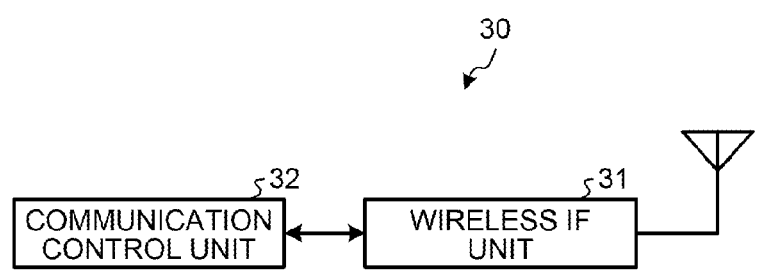
FIG. 8 is a diagram illustrating an example of a C-number storage unit for storing a group of C-numbers for CA.
FIG. 9 is a functional block diagram illustrating a configuration example of a terminal of the first embodiment.

The C-number storage unit 14 stores therein the group of C-numbers for CA including the C-numbers of N+1 to 65535 for CA. FIG. 8 is a diagram illustrating an example of the C-number storage unit for storing the group of C-numbers for CA. As illustrated in FIG. 8, a "C-RNTI number" and an "assignment status" are stored in an associated manner.

The "C-RNTI number" indicates the C-numbers of N+1 to 65535 for CA included in the group of C-numbers for CA. The "assignment status" indicates whether each of the C-numbers for CA is currently assigned. In the "assignment status", "in use" indicates that a C-number for CA is currently assigned, "free" indicates that a C-number for CA is not assigned, and "not for use" indicates that assignment of a C-number for CA is prohibited. FIG. 8 illustrates an example in which N=023401.

In execution of CA communication, the second assigning unit 15 selects an arbitrary C-number for CA from the group of C-numbers for CA stored in the C-number storage unit 14, and assigns the selected C-number for CA to the terminal 30 via the wireless IF unit 11.

The RE unit 16 performs a predetermined wireless process, such as amplification, modulation, demodulation, and filtering of wireless signals.

Next, a configuration example of the terminal 30 of the first embodiment will be described. FIG. 9 is a functional block diagram illustrating a configuration example of the terminal of the first embodiment. As illustrated in FIG. 9, the terminal 30 includes a wireless IF unit 31 and a communication control unit 32.

The wireless IF unit 31 performs a predetermined wireless reception process on signals received via an antenna, and outputs the signals to the communication control unit 32. For example, in execution of non-CA communication, the wireless IF unit 31 performs the predetermined wireless reception process on various Messages that are received through a random access procedure, and outputs the Messages to the communication control unit 32. Examples of the various Messages received through the random access procedure include the Message 2 containing a C-number that is assigned by the base station 10 in response to a request from the terminal 30.

Further, the wireless IF unit 31 performs a predetermined wireless transmission process on signals received from the communication control unit 32, and transmits the signals via the antenna. For example, in execution of non-CA communication, the wireless IF unit 31 performs the predetermined wireless transmission process on various Messages that are transmitted through the random access procedure, and transmits the Messages via the antenna. Examples of the various Messages transmitted through the random access procedure include the Message 1 containing a C-number request to request a C-number from the terminal 30 to the base station 10.

The communication control unit 32 performs non-CA communication or CA communication by using the C-number for non-CA or the C-number for CA assigned by the base station 10. Further, the communication control unit 32 transmits and receives various Messages for performing non-CA communication or CA communication to and from the base station 10 via the wireless IF unit 31.

Figure 10:
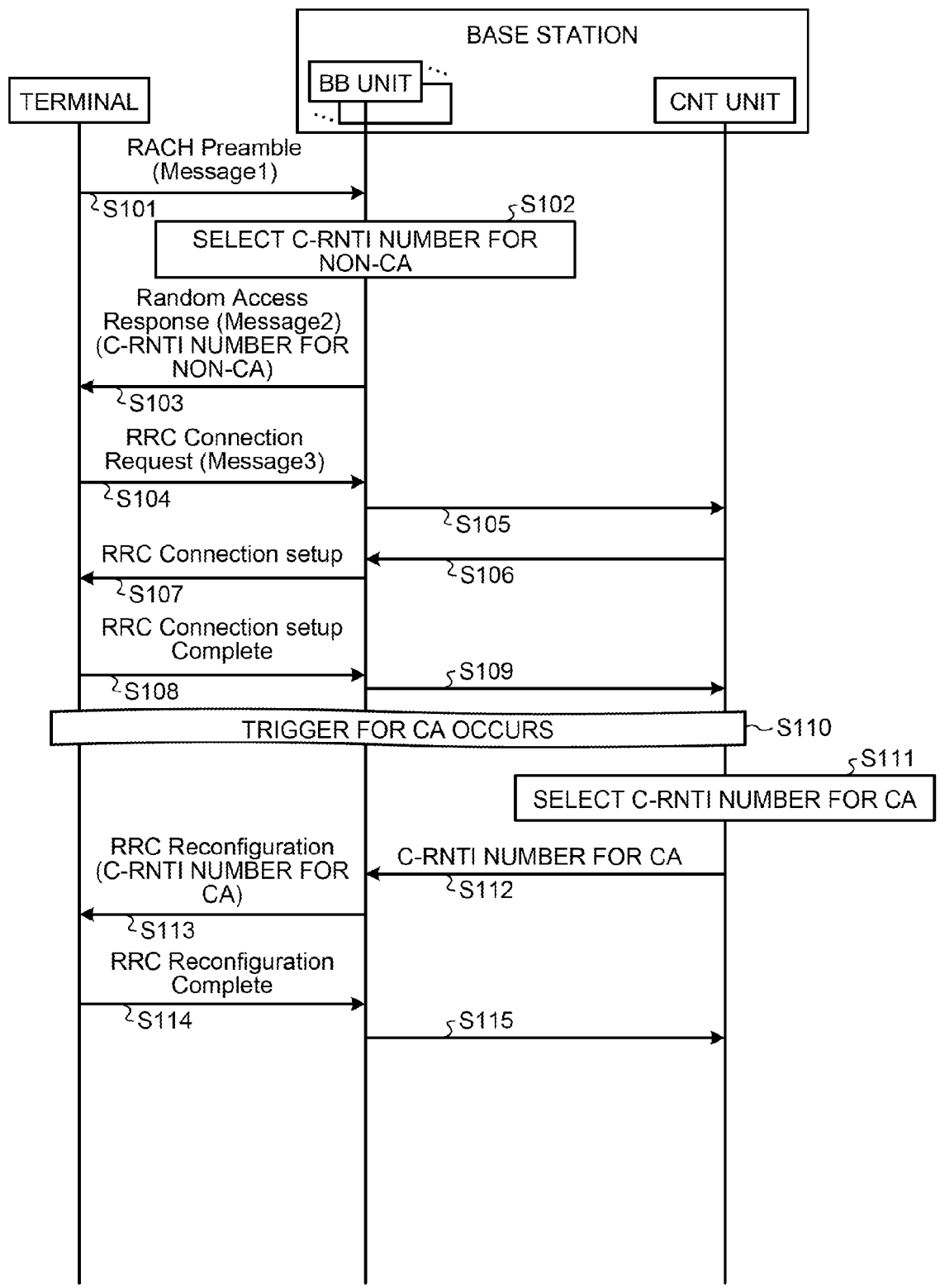
FIG. 10 is a sequence diagram illustrating an example of processing operation performed by the base station and the terminal of the first embodiment.

Next, processing operation preformed by the base station 10 and the terminal 30 of the first embodiment will be described. FIG. 10 is a sequence diagram illustrating an example of the processing operation performed by the base station and the terminal of the first embodiment. In FIG. 10, a "terminal" corresponds to the terminal 30, and a "base station" corresponds to the base station 10.

As illustrated in FIG. 10, upon belonging to any of all the cells of the base station, the terminal sends, to the base station, a C-number request to request the base station to provide a C-number in order to perform non-CA communication (Step S101). The C-number request is transmitted by using the Message 1 containing a Random Access CHannel (RACH) Preamble, for example.

The BB unit of the base station, upon receiving the C-number request from the terminal, selects an arbitrary C-number for non-CA from the group of C-numbers for non-CA stored in the C-number storage unit 12 (Step S102).

Then, the BB unit of the base station assigns the selected C-number for non-CA to the terminal (Step S103). The C-number for non-CA is assigned by using the Message 2 containing a response (Random Access Response) to the Message 1, for example.

Subsequently, the terminal transmits and receives other Messages or the like to and from the base station through the random access procedure, and performs non-CA communication by using the C-number for non-CA (Steps S104 to S109).

Further, when a trigger to perform CA communication occurs (Step S110), the CNT unit of the base station selects an arbitrary C-number for CA from the group of C-numbers for CA stored in the C-number storage unit 14 (Step S111). The trigger to perform the CA communication includes an event, such as viewing of moving images, and is appropriately set by a designer or the like of the communication system, for example.

Then, the CNT unit of the base station assigns the selected C-number for CA to the terminal via the BB unit (Steps S112 and S113). The C-number for CA is assigned by using a Radio Resource Control (RRC) Reconfiguration transmitted and received at the beginning of communication, for example.

The terminal returns an RRC Reconfiguration Complete, as a response to the RRC Reconfiguration, to the base station, and performs CA communication by using the C-number for CA (Steps S114 and S115).

As described above, in the first embodiment, the base station 10 assigns a C-number for non-CA unique to each of the cells from the predetermined number of C-numbers in execution of non-CA communication, and assigns a C-number for CA common to two or more cells from the C-numbers excluding the C-numbers for non-CA in execution of CA communication. Then, the terminal 30 performs the non-CA communication or the CA communication by using the C-number for non-CA or the C-number for CA assigned by the base station 10.

Therefore, according to the first embodiment, as compared to the underlying technology to fix the range of the C-numbers for each cell, it is possible to dynamically distinguish between the C-numbers for non-CA and the C-numbers for CA among the predetermined number of C-numbers, so that it is possible to efficiently prevent deficiency in the C-numbers for each cell. As a result, according to the first embodiment, it is possible to prevent depletion of the C-numbers to be assigned to the terminal 30 when CA communication is performed.

Further, in the first embodiment, the predetermined number of C-numbers are divided, in advance, into the group of C-numbers for non-CA and the group of C-numbers for CA, and the base station 10 assigns a C-number for non-CA or a C-number for CA to the terminal 30 from the group of C-numbers for non-CA or the group of C-numbers for CA when non-CA communication or CA communication is performed.

Therefore, according to the first embodiment, it is possible to appropriately adjust the number of C-numbers for non-CA and the number of C-numbers for CA to be assigned to the terminal 30 depending on actual operation, so that it is possible to efficiently prevent depletion of the C-numbers to be assigned to the terminal 30.

[b] Second Embodiment

In the first embodiment, an example has been described in which a base station assigns a C-number for non-CA and a C-number for CA to a terminal from the group of C-numbers for non-CA and the group of C-numbers for CA that are obtained by dividing the predetermined number of C-numbers in advance. In contrast, in a second embodiment, a base station assigns, in ascending order, a C-number for non-CA to a terminal from a predetermined number of C-numbers, and assigns, in descending order, a C-number for CA from a predetermined number of C-numbers that are not assigned as the C-numbers for non-CA. In the following, a difference from the first embodiment will be mainly described. The same operation as the first embodiment will be denoted by the same symbols, and explanation thereof will be omitted. Further, in the following, the base station 10 of the first embodiment may be referred to as a base station 210.

Figure 11:
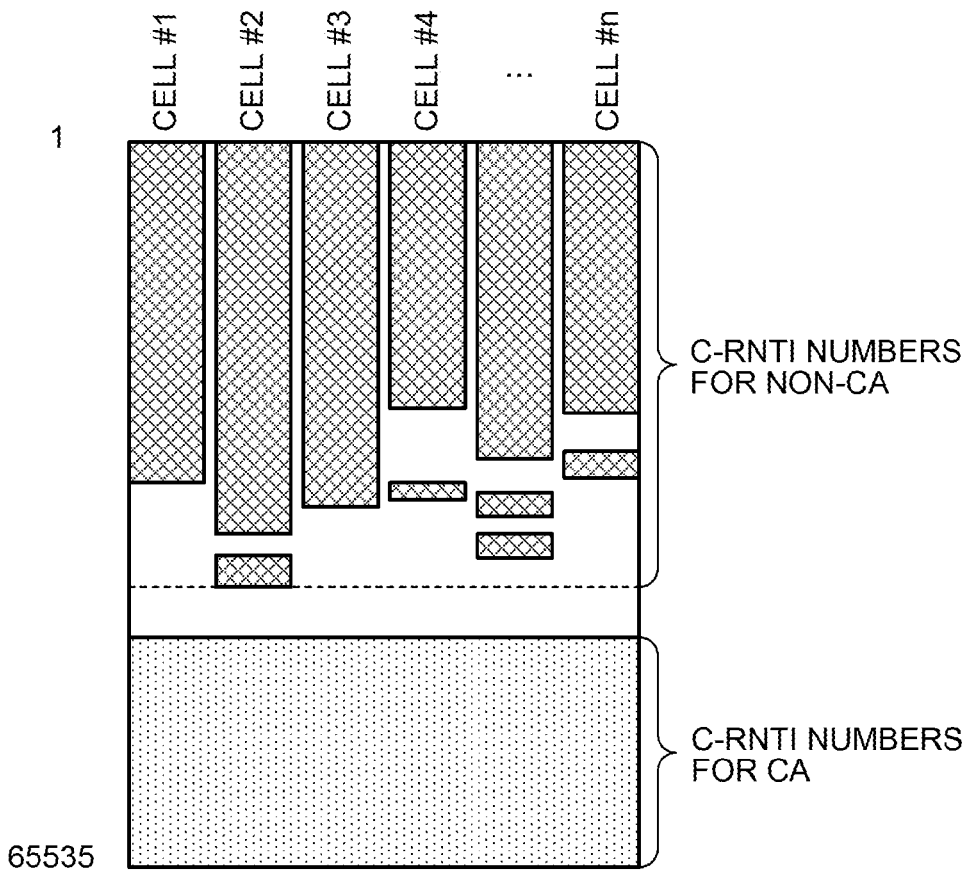
FIG. 11 is a diagram for explaining a C-number assigning method of a second embodiment.

FIG. 11 is a diagram for explaining a C-number assigning method of the second embodiment. In the C-number assigning method of the second embodiment, a predetermined number of C-numbers are dynamically divided into a group of C-numbers for non-CA including C-numbers unique to the respective cells of the base station 210, and a group of C-numbers for CA including a C-number common to two or more of all the cells of the base station 210. In the example in FIG. 11, the C-numbers of 1 to 65535 are dynamically divided into a group of C-numbers for non-CA including C-numbers of 1 to N (N is an integer equal to or greater than 2) and a group of C-numbers for CA including C-numbers of N+1 to 65535. The value of N is dynamically set as the maximum C-number for non-CA corresponding to each of the cells.

In the C-number assigning method of the second embodiment, in execution of non-CA communication with the terminal 30, the base station 210 assigns, in ascending order, a C-number for non-CA to the terminal 30 from the predetermined number of C-numbers. It is sufficient that the C-number for non-CA is unique to each of the cells. Therefore, a C-number for non-CA corresponding to a certain cell and a C-number for non-CA corresponding to a different cell may be the same or different from each other. In the example in FIG. 11, in execution of non-CA communication, the base station 210 assigns, in order from 1 to 65535, a C-number for non-CA to the terminal 30 from the predetermined number of C-numbers.

In contrast, in execution of CA communication with the terminal 30, the base station 210 assigns, in descending order, a C-number for CA to the terminal 30 from the C-numbers that are not assigned as the C-numbers for non-CA among the predetermined number of C-numbers. The C-number for CA is a C-number common to the two or more cells; therefore, the C-number for CA corresponding to a certain cell and the C-number for CA corresponding to a different cell are the same. In the example in FIG. 11, in execution of CA communication, the base station 210 assigns, in order from 65535 to 1, a C-number for CA to the terminal 30 from the C-numbers that are not assigned as the C-numbers for non-CA among the predetermined number of C-numbers.

As described above, in the C-number assigning method of the second embodiment, in execution of CA communication, the base station 210 assigns, in descending order, a C-number for CA to the terminal 30 from the C-numbers that are not assigned as the C-numbers for non-CA among the predetermined number of C-numbers. Therefore, according to the second embodiment, as compared to the underlying technology to fix the range of the C-numbers for each cell, it is possible to dynamically distinguish between the C-numbers for non-CA and the C-numbers for CA among the predetermined number of C-numbers, so that it is possible to efficiently prevent deficiency in the C-numbers for each cell. As a result, according to the second embodiment, it is possible to prevent depletion of the C-numbers to be assigned to the terminal 30 when CA communication is performed. Further, according to the second embodiment, it is possible to appropriately adjust the number of C-numbers for non-CA and the number of C-numbers for CA to be assigned to the terminal 30 depending on actual operation, so that it is possible to efficiently prevent depletion of the C-numbers to be assigned to the terminal 30.

Figure 12:
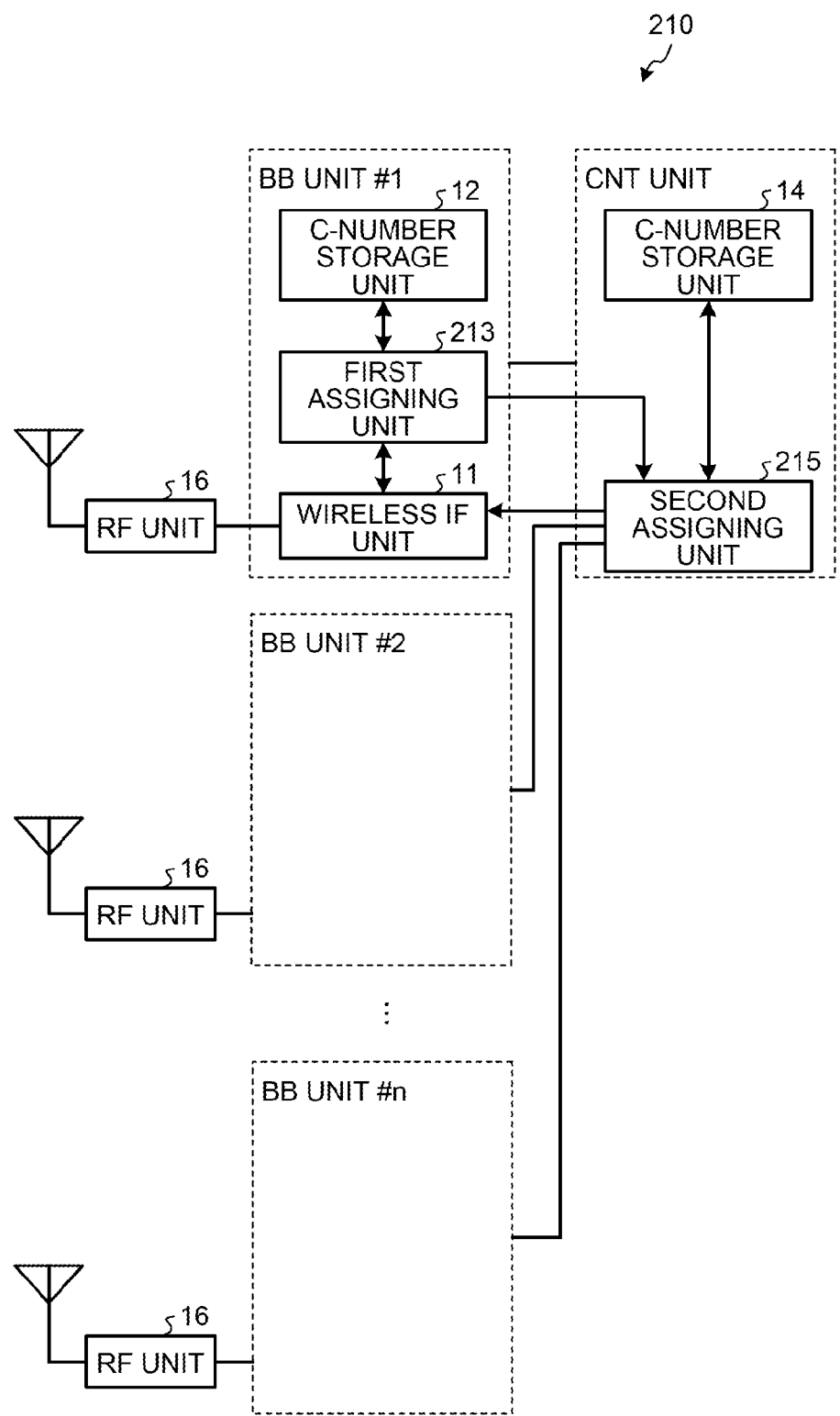
FIG. 12 is a functional block diagram illustrating a configuration example of a base station of the second embodiment.

Next, a configuration example of the base station 210 of the second embodiment will be described. FIG. 12 is a functional block diagram illustrating a configuration example of the base station of the second embodiment. As illustrated in FIG. 12, the base station 210 includes the wireless IF unit 11, the C-number storage unit 12, a first assigning unit 213, the C-number storage unit 14, a second assigning unit 215, and the RE unit 16. The wireless IF unit 11, the C-number storage unit 12, and the first assigning unit 213 may be configured as a single BB unit, and the C-number storage unit 14 and the second assigning unit 215 may be configured as a CNT unit.

The number of some parts of the BB unit or the number of the entire BB units may be plural depending on the mode of CA. In the example in FIG. 12, BB units #1 to #n are provided as n BB units. Further, for example, in execution of CA communication by simultaneously using at least two different cells, it may be possible to provide a plurality of BB units corresponding to the cells to be used simultaneously. Furthermore, as illustrated in FIG. 12, the base station 210 may include a plurality of sets of the BB unit, and each set may correspond to each cell.

The C-number storage unit 12 and the C-number storage unit 14 stores therein the C-numbers of 1 to 65535.

In execution of non-CA communication, the first assigning unit 213 selects, in ascending order, a C-number for non-CA from the predetermined number of C-numbers stored in the C-number storage unit 12, and assigns the selected C-number for non-CA to the terminal 30 via the wireless IF unit 11.

In execution of CA communication, the second assigning unit 215 selects, in descending order, a C-number for CA from the C-numbers that are not assigned as the C-numbers for non-CA by the first assigning unit 213 among the predetermined number of C-numbers stored in the C-number storage unit 14. Then, the second assigning unit 215 assigns the selected C-number for CA to the terminal 30 via the wireless IF unit 11.

Further, when the predetermined number of C-numbers stored in the C-number storage unit 14 do not include an identification number that is not assigned as the C-number for non-CA, the second assigning unit 215 suspends assignment of a C-number for CA. Upon suspension of the assignment of the C-number for CA, the communication control unit 32 of the terminal 30 continues non-CA communication by using the C-number for non-CA.

Figure 13:
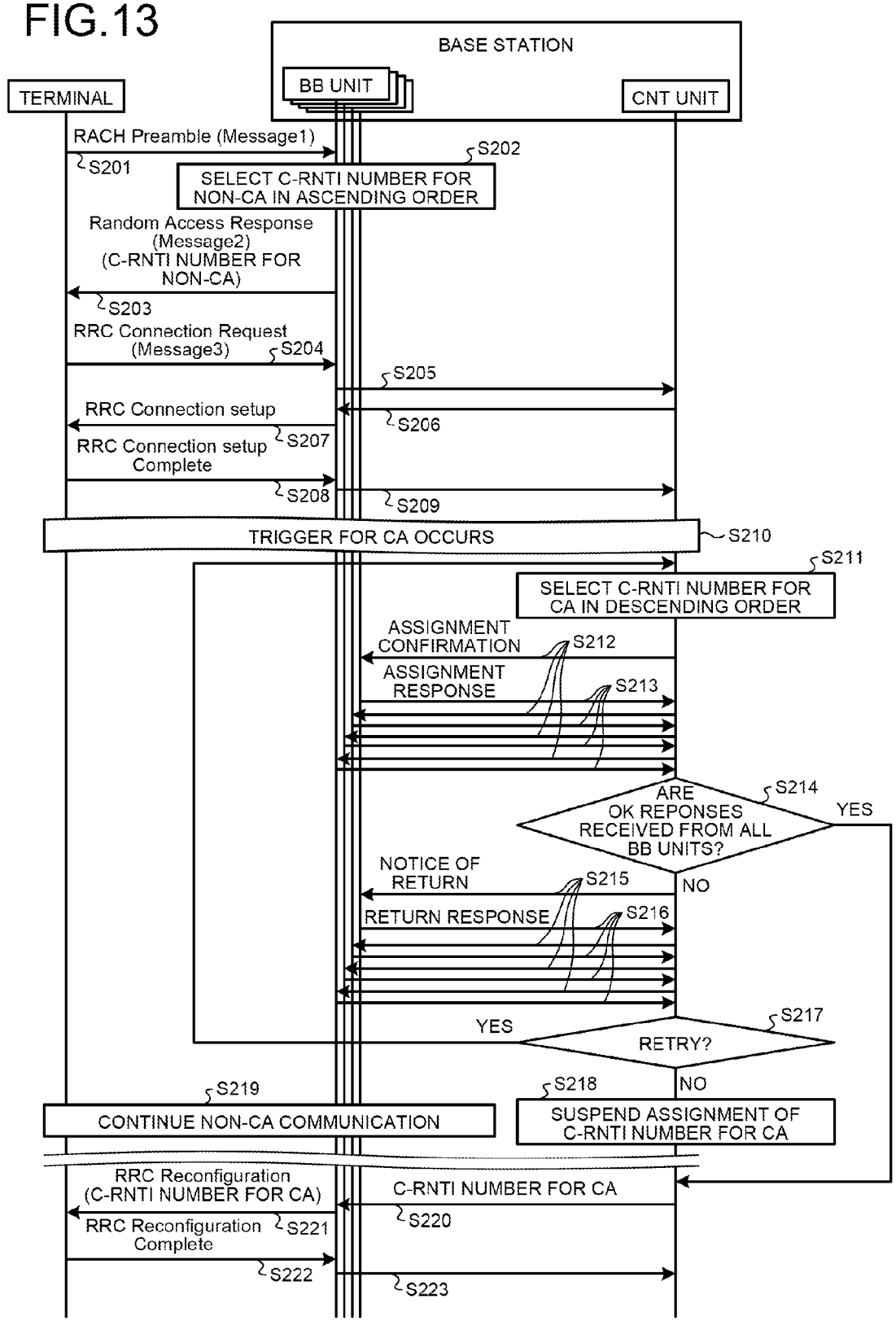
FIG. 13 is a sequence diagram illustrating an example of processing operation performed by the base station and a terminal of the second embodiment.

Next, processing operation preformed by the base station 210 and the terminal 30 of the second embodiment will be described. FIG. 13 is a sequence diagram illustrating an example of the processing operation performed by the base station and the terminal of the second embodiment. In FIG.

13, a "terminal" corresponds to the terminal 30, and a "base station" corresponds to the base station 210.

As illustrated in FIG. 13, upon belonging to any of all the cells of the base station, the terminal sends, to the base station, a C-number request to request the base station to provide a C-number in order to perform non-CA communication (Step S201). The C-number request is transmitted by using the Message 1 containing a RACH Preamble.

Upon receiving the C-number request from the terminal, the BB unit of the base station selects, in ascending order, a C-number for non-CA from the predetermined number of C-numbers stored in the C-number storage unit 12 (Step S202).

Then, the BB unit of the base station assigns the selected C-number for non-CA to the terminal (Step S203). The C-number for non-CA is assigned by using the Message 2 containing a response (Random Access Response) to the Message 1, for example.

Subsequently, the terminal transmits and receives other Messages or the like to and from the base station through the random access procedure, and performs non-CA communication by using the C-number for non-CA (Steps S204 to S209).

Further, when a trigger to perform CA communication occurs (Step S210), the CNT unit of the base station selects, in descending order, a C-number for CA from the C-numbers that are not assigned as the C-numbers for non-CA among the predetermined number of C-numbers stored in the C-number storage unit 14 (Step S211). The trigger to perform the CA communication includes an event, such as viewing of moving images, and is appropriately set by a designer or the like of the communication system, for example.

Subsequently, the CNT unit of the base station transmits, to the BB unit, an assignment confirmation to confirm a permission for the assignment of the C-number for CA selected in descending order (Step S212). The BB unit returns, to the CNT unit, an assignment response as a response to the assignment confirmation (Step S213). Specifically, the BB unit refers to the C-number storage unit 12 and determines whether the C-number for CA, for which the permission for assignment is requested by the assignment confirmation, has already been assigned as the C-number for non-CA. If the C-number for CA, for which the permission for assignment is requested by the assignment confirmation, has already been assigned as the C-number for non-CA, the BB unit returns an NG response, as the assignment response, indicating that the assignment of the C-number for CA is not permitted, to the CNT unit. In contrast, if the C-number for CA, for which the permission for assignment is requested by the assignment confirmation, has not been assigned as the C-number for non-CA, the BB unit assigns an OK response, as the assignment response, indicating that the assignment of the C-number for CA is permitted, to the CNT unit.

The CNT unit of the base station determines whether the OK responses as the assignment responses are received from all of the BB units (Step S214).

Upon receiving an NG response as the assignment response from at least one of the BB units (NO at Step S214), the CNT unit of the base station determines not to assign the selected C-number for CA. Then, the CNT unit of the base station gives a notice of return of the C-number for CA, which is determined not to be assigned, to the BB unit that has transmitted the OK response (Step S215). Upon receiving the notice of return, the BB unit returns a return response as a response to the notice of return (Step S216). Then, the BB unit refers to the C-number storage unit 12 and manages the C-number for CA returned from the CNT unit as the C-number for non-CA.

When the assignment of the C-number for CA is to be retried (YES at Step S217), the CNT unit of the base station returns the process to Step S211, and when the assignment is not to be retried (NO at Step S217), the CNT unit suspends the assignment of the C-number for CA (Step S218). Upon suspension of the assignment of the C-number for CA, the non-CA communication between the base station and the terminal is continued (Step S219).

In contrast, upon receiving the OK responses as the assignment responses from all of the BB units (YES at Step S214), the CNT unit of the base station assigns the selected C-number for CA to the terminal via the BB unit (Steps S220 and S221). The C-number for CA is assigned by using an RRC Reconfiguration transmitted and received at the beginning of communication, for example.

The terminal returns an RRC Reconfiguration Complete, as a response to the RRC Reconfiguration, to the base station, and performs CA communication by using the C-number for CA (Steps S222 and S223).

As described above, in the second embodiment, in execution of CA communication, the base station 210 assigns, in descending order, a C-number for CA to the terminal 30 from the C-numbers that are not assigned as the C-numbers for non-CA among the predetermined number of C-numbers.

Therefore, according to the second embodiment, as compared to the underlying technology to fix the range of the C-numbers for each cell, it is possible to dynamically distinguish between the C-numbers for non-CA and the C-numbers for CA among the predetermined number of C-numbers, so that it is possible to efficiently prevent deficiency in the C-numbers for each cell. As a result, according to the second embodiment, it is possible to prevent depletion of the C-numbers to be assigned to the terminal 30 when CA communication is performed. Further, according to the second embodiment, it is possible to appropriately adjust the number of C-numbers for non-CA and the number of C-numbers for CA to be assigned to the terminal 30 depending on actual operation, so that it is possible to efficiently prevent depletion of the C-numbers to be assigned to the terminal 30.

Furthermore, in the second embodiment, when the predetermined number of C-numbers do not include a C-number that is not assigned as the C-number for non-CA, the base station 210 suspends assignment of a C-number for CA. Upon suspension of the assignment of the C-number for CA, the terminal 30 continues non-CA communication by using the C-number for non-CA.

Therefore, according to the second embodiment, when the assignment of the C-number for CA is suspended, it is possible to appropriately continue non-CA communication by using the C-number for non-CA.

[c] Third Embodiment

In the first embodiment, an example has been described in which a base station assigns a C-number for non-CA and a C-number for CA to a terminal from the group of C-numbers for non-CA and the group of C-numbers for CA that are obtained by dividing the predetermined number of C-numbers in advance. In contrast, in a third embodiment, a base station assigns a C-number for non-CA and a C-number for CA to the terminal by using a plurality of blocks of C-numbers that are obtained by dividing the predetermined number of C-numbers into a predetermined number of blocks. In the following, a difference from the first embodiment will be mainly described. The same operation as the first embodiment will be denoted by the same symbols, and explanation thereof will be omitted. Further, in the following, the base station 10 of the first embodiment may be referred to as a base station 310.

Figure 14:
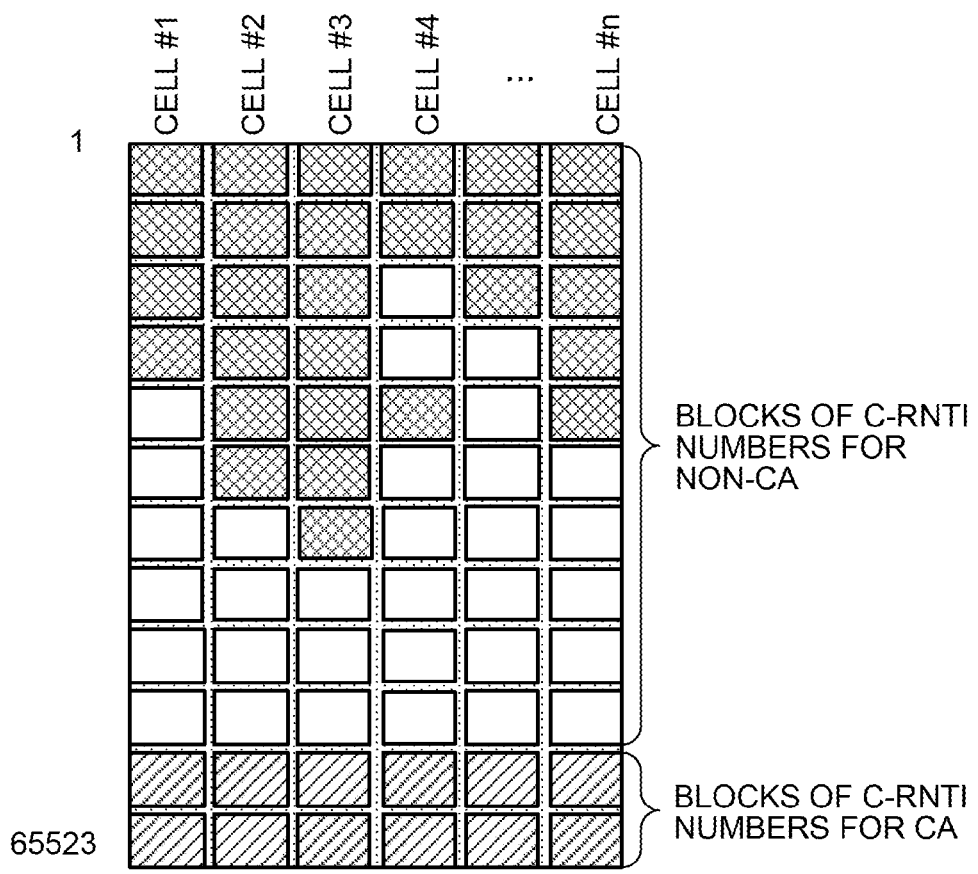
FIG. 14 is a diagram for explaining a C-number assigning method of a third embodiment.

FIG. 14 is a diagram for explaining a C-number assigning method of the third embodiment. In the C-number assigning method of the third embodiment, a predetermined number of C-numbers are divided into 1 to M blocks (M is an integer equal to or greater than 2). Each of the blocks obtained by dividing the predetermined number of C-numbers into the 1 to M blocks is referred to as a "C-number block" below. In the example in FIG. 14, the 1 to M C-number blocks are dynamically segmented into C-number blocks for non-CA including C-numbers for non-CA and C-number blocks for CA including C-numbers for CA. The value of M is appropriately adjusted depending on actual operation.

In the C-number assigning method of the third embodiment, in execution of non-CA communication with the terminal 30, the base station 310 selects, in ascending order, a C-number block from among the plurality of C-number blocks, and assigns a C-number for non-CA to the terminal 30 from the selected C-number block. It is sufficient that the C-number for non-CA is unique to each of the cells. Therefore, a C-number for non-CA corresponding to a certain cell and a C-number for non-CA corresponding to a different cell may be the same or different from each other. In the example in FIG. 14, in execution of non-CA communication, the base station 310 selects a C-number block for non-CA from among the plurality of C-number blocks for non-CA in order from 1 to M, and assigns a C-number for non-CA to the terminal 30 from the selected C-number block for non-CA.

In contrast, in execution of CA communication with the terminal 30, the base station 310 assigns a C-number for CA to the terminal 30 from a non-selected C-number block among the plurality of C-number blocks. The C-number for CA is a C-number common to the two or more cells; therefore, the C-number for CA corresponding to a certain cell and the C-number for CA corresponding to a different cell are the same. In the example in FIG. 14, in execution of CA communication, the base station 310 selects a C-number block for CA from among the plurality of C-number blocks for CA in order from M to 1, and assigns a C-number for CA to the terminal 30 from the selected C-number block for CA.

As described above, in the C-number assigning method of the third embodiment, in execution of CA communication, a C-number for CA is assigned to the terminal 30 from a C-number block that is not selected at the time of non-CA communication among the C-number blocks. Therefore, according to the third embodiment, as compared to the underlying technology to fix the range of the C-numbers for each cell, it is possible to dynamically distinguish between the C-numbers for non-CA and the C-numbers for CA among the predetermined number of C-numbers, so that it is possible to efficiently prevent deficiency in the C-numbers for each cell. As a result, according to the third embodiment, it is possible to prevent depletion of the C-numbers to be assigned to the terminal 30 when CA communication is performed. Further, according to the third embodiment, it is possible to manage the C-numbers for non-CA and the C-numbers for CA in units of blocks, so that it is possible to prevent depletion of the C-numbers to be assigned to the terminal 30.

Figure 15:
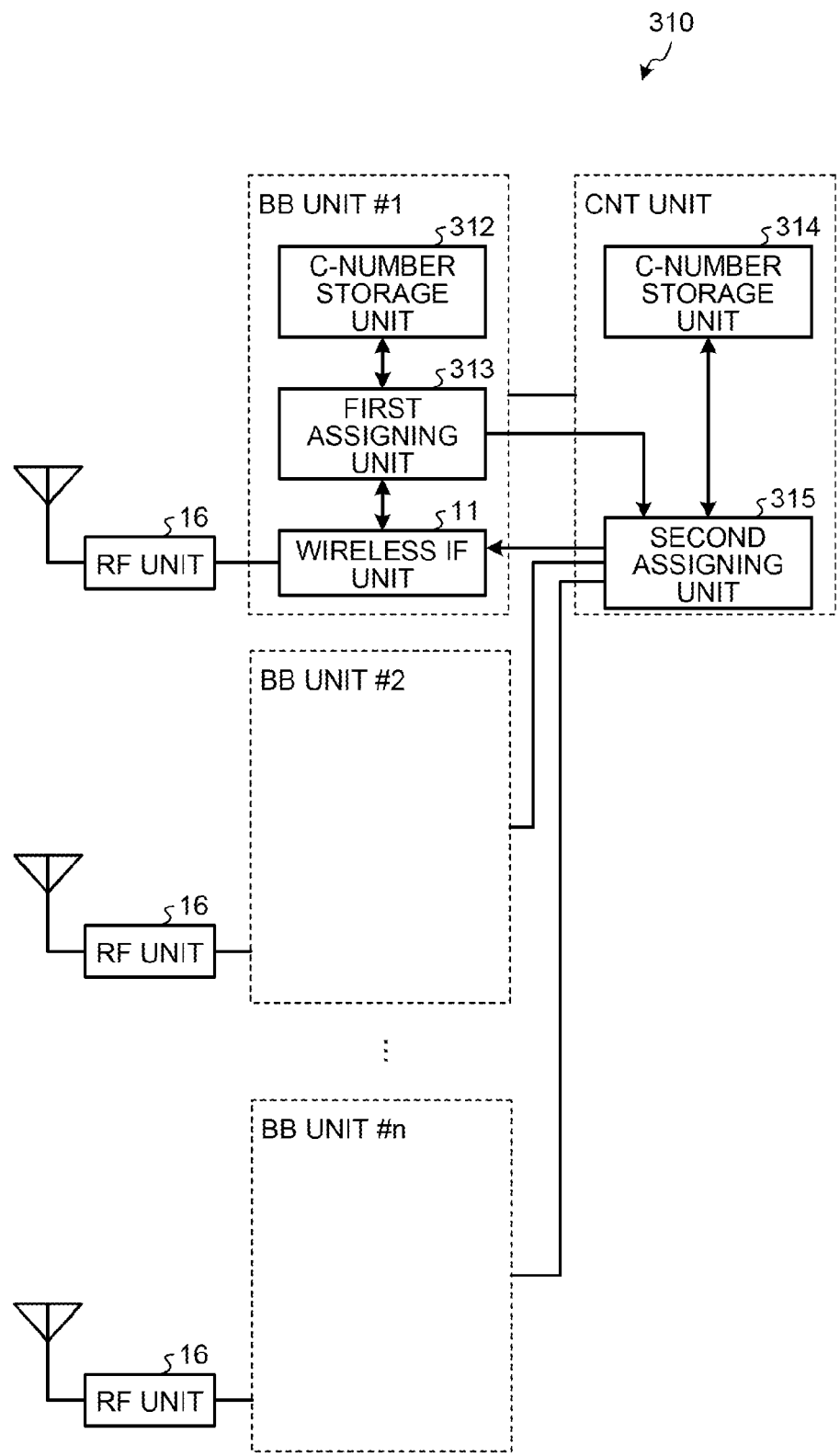
FIG. 15 is a functional block diagram illustrating a configuration example of a base station of the third embodiment.

Next, a configuration example of the base station 310 of the third embodiment will be described. FIG. 15 is a functional block diagram illustrating a configuration example of the base station of the third embodiment. As illustrated in FIG. 15, the base station 310 includes the wireless IF unit 11, a C-number storage unit 312, a first assigning unit 313, a C-number storage unit 314, a second assigning unit 315, and the RE unit 16. The wireless IF unit 11, the C-number storage unit 312, and the first assigning unit 313 may be configured as a single BB unit, and the C-number storage unit 314 and the second assigning unit 315 may be configured as a CNT unit.

The number of some parts of the BB unit or the number of the entire BB units may be plural depending on the mode of CA. In the example in FIG. 15, BB units #1 to #n are provided as n BB units. Further, for example, in execution of CA communication by simultaneously using at least two different cells, it may be possible to provide a plurality of BB units corresponding to the cells to be used simultaneously. Furthermore, as illustrated in FIG. 6, the base station 310 may include a plurality of sets of the BB unit, and each set may correspond to each cell.

Figure 16:
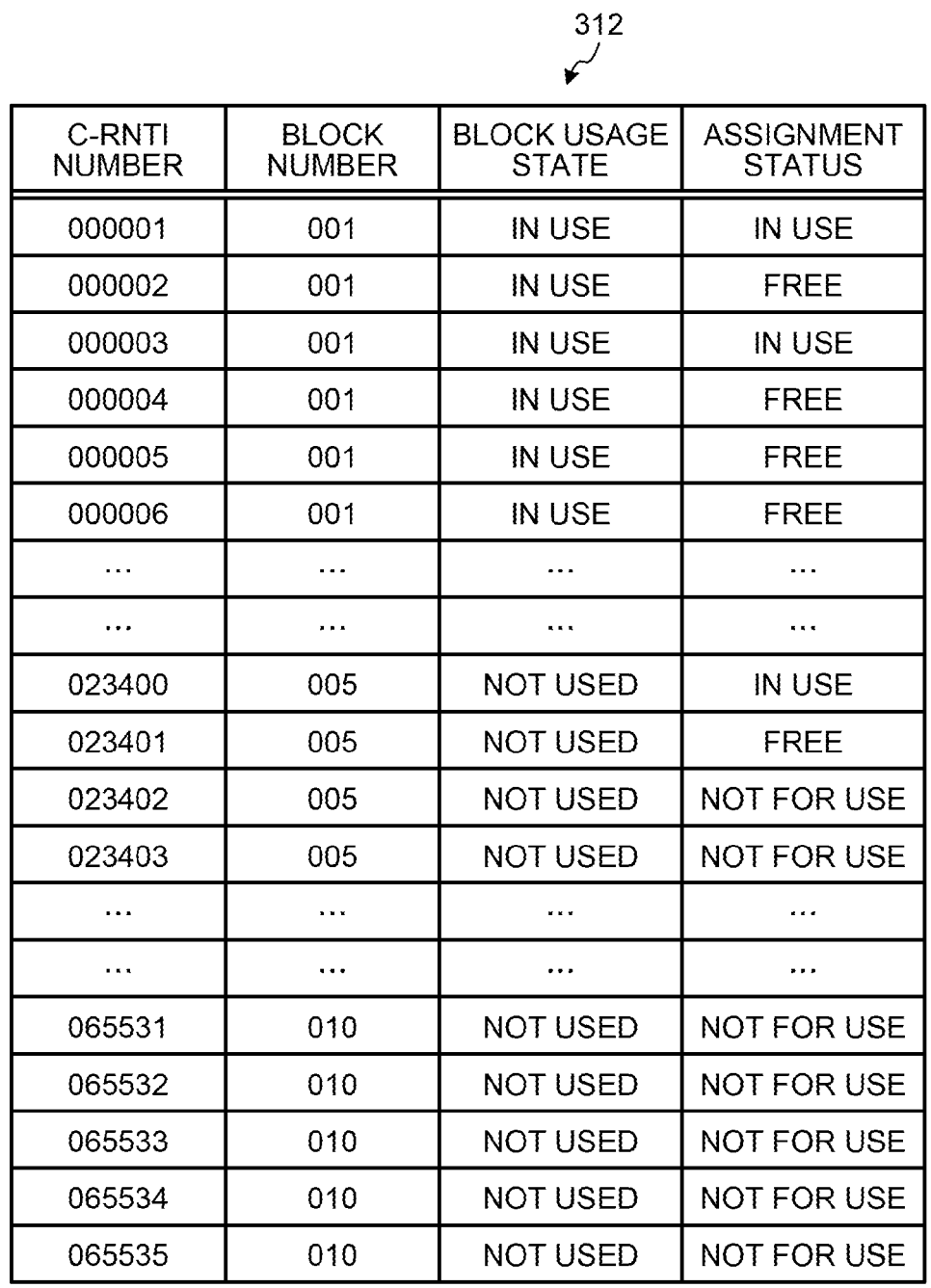
FIG. 16 is a diagram illustrating an example of a C-number storage unit of the third embodiment.

The C-number storage unit 312 stores therein C-numbers for non-CA belonging to each of the C-number blocks for non-CA, in association with each of the C-number blocks for non-CA. FIG. 16 is a diagram illustrating an example of the C-number storage unit of the third embodiment. As illustrated in FIG. 16, the C-number storage unit 312 stores therein a "C-RNTI number", a "block number", a "block usage state", and an "assignment status" in an associated manner.

The "C-RNTI number" indicates a C-number for non-CA belonging to a C-number block for non-CA. The "block number" indicates an identification number of a C-number block for non-CA. The "block usage state" indicates whether a C-number block for non-CA is currently assigned. In the "block usage state", "in use" indicates that a C-number block for non-CA is currently assigned, and "not used" indicates that a C-number block for non-CA is not assigned. The "assignment status" indicates whether a C-number for non-CA belonging to a C-number block for non-CA is currently assigned. In the "assignment status", "in use" indicates that a C-number for non-CA is currently assigned, "free" indicates that a C-number for non-CA is not assigned, and "not for use" indicates that assignment of a C-number for non-CA is prohibited.

In execution of non-CA communication, the first assigning unit 313 selects, in ascending order, a C-number block for non-CA from the plurality of C-number blocks for non-CA stored in the C-number storage unit 312. Then, the first assigning unit 313 selects a C-number for non-CA from the selected C-number block for non-CA, and assigns the selected C-number for non-CA to the terminal 30 via the wireless IF unit 11.

Further, after assignment of the C-number for non-CA, if a total number of C-numbers that are not assigned as the C-numbers for non-CA among the C-numbers stored in the C-number storage unit 312 is equal to or smaller than a threshold, the first assigning unit 313 performs a process as described below. Specifically, the first assigning unit 313 requests the second assigning unit 315 to provide an unused C-number block among the C-number blocks for CA stored in the C-number storage unit 314.

Further, when the C-number blocks stored in the C-number storage unit 312 include a C-number block containing only non-assigned C-numbers and a total number of non-assigned C-numbers belonging to each of the other C-number blocks is equal to or greater than a threshold, the first assigning unit 313 performs a process as described below. Specifically, the first assigning unit 313 returns the C-number block containing only non-assigned C-numbers to the second assigning unit 315.

The C-number storage unit 314 stores therein C-numbers for CA belonging to each of the C-number blocks for CA, in association with each of the C-number blocks for CA. A data structure of the C-number storage unit 314 is the same as the data structure of the C-number storage unit 312 as illustrated in FIG. 16.

In execution of CA communication, the second assigning unit 315 selects a C-number for CA from a C-number block that is not selected by the first assigning unit 313 among the plurality of C-number blocks for CA stored in the C-number storage unit 314. Then, the second assigning unit 315 assigns the selected C-number for CA to the terminal 30 via the wireless IF unit 11.

Further, the second assigning unit 315 provides an unused C-number block to the first assigning unit 313 in response to a request from the first assigning unit 313.

Figure 17:
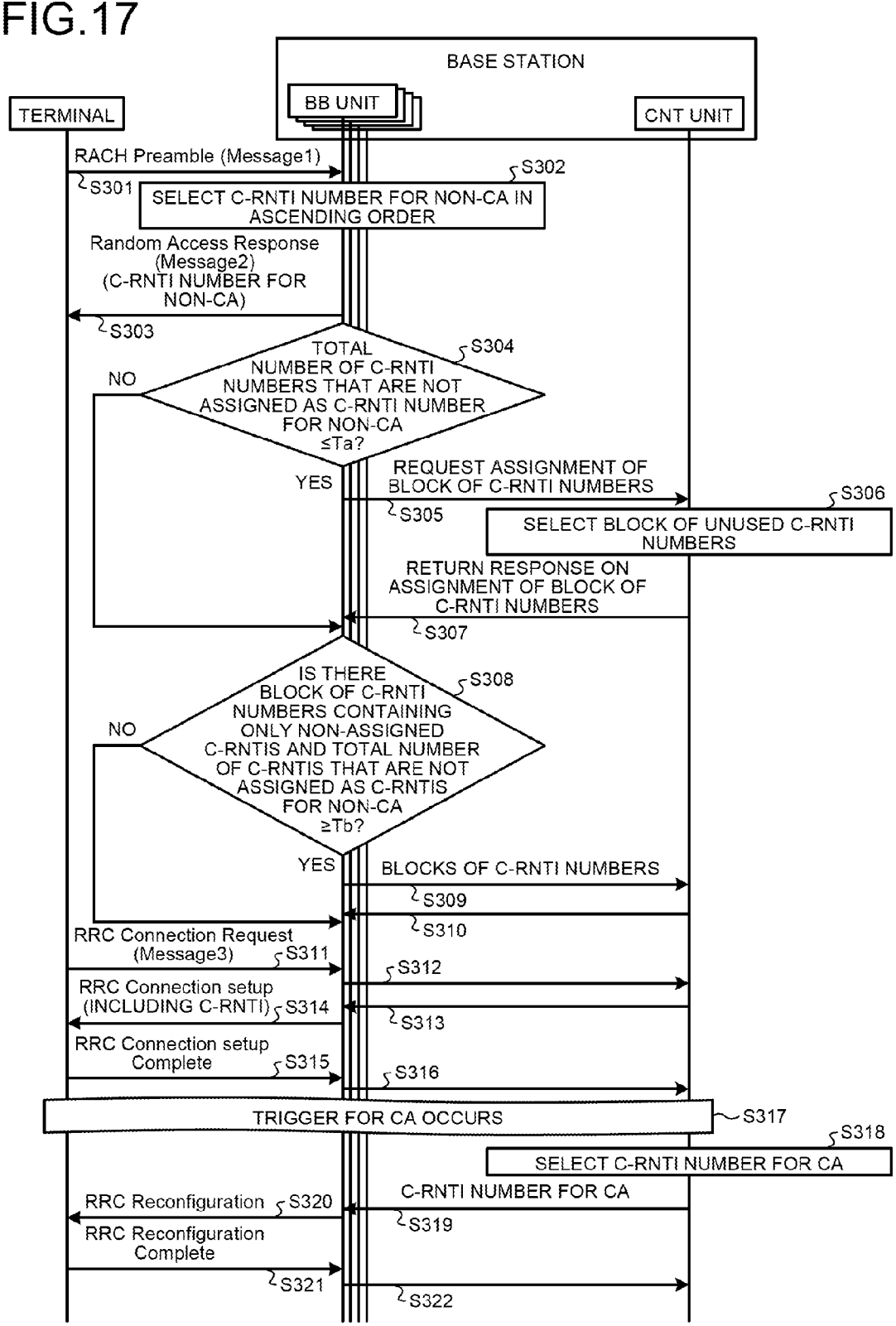
FIG. 17 is a sequence diagram illustrating an example of processing operation performed by the base station and a terminal of the third embodiment.

Next, processing operation performed by the base station 310 and the terminal 30 of the third embodiment will be described. FIG. 17 is a sequence diagram illustrating an example of the processing operation performed by the base station and the terminal of the third embodiment. In FIG. 17, a "terminal" corresponds to the terminal 30, and a "base station" corresponds to the base station 310.

As illustrated in FIG. 17, upon belonging to any of all the cells of the base station, the terminal sends, to the base station, a C-number request to request the base station to provide a C-number in order to perform non-CA communication (Step S301). The C-number request is transmitted by using the Message 1 containing a RACH Preamble.

Upon receiving the C-number request from the terminal, the BB unit of the base station selects, in ascending order, a C-number block for non-CA from among the C-number blocks for non-CA stored in the C-number storage unit 312 (Step S302).

Then, the BB unit of the base station selects a C-number for non-CA from the selected C-number block for non-CA, and assigns the selected C-number for non-CA to the terminal (Step S303). The C-number for non-CA is assigned by using the Message 2 containing a response (Random Access Response) to the Message 1, for example.

Subsequently, the BB unit of the base station determines whether a total number of C-numbers that are not assigned as the C-numbers for non-CA among the C-numbers belonging to each of the C-number blocks stored in the C-number storage unit 312 is equal to or smaller than a threshold Ta (Step S304). If the total number of the C-numbers that are not assigned as the C-numbers for non-CA is greater than the threshold Ta (NO at Step S304), the BB unit of the base station proceeds to Step S308.

In contrast, if the total number of the C-numbers that are not assigned as the C-numbers for non-CA is equal to or smaller than the threshold Ta (YES at Step S304), the BB unit of the base station performs a process as described below. Specifically, the BB unit of the base station requests the CNT unit to provide an unused C-number block from among the C-number blocks for CA stored in the C-number storage unit 314 (Step S305).

The CNT unit of the base station selects an unused C-number block from the C-number storage unit 314 in response to the request to provide an unused C-number block (Step S306), and provides the selected unused C-number block to the BB unit (Step S307).

Subsequently, the BB unit of the base station determines whether the C-number blocks stored in the C-number storage unit 312 include a C-number block containing only non-assigned C-numbers, and whether a total number of non-assigned C-numbers belonging to each of the other C-number blocks is equal to or greater than a threshold Tb (Step S308). If there is no C-number block containing only non-assigned C-numbers, or if the total number of non-assigned C-numbers belonging to each of the other C-number blocks is smaller than the threshold Tb (NO at Step S308), the BB unit of the base station proceeds to Step S311.

In contrast, if the C-number blocks include a C-number block containing only non-assigned C-numbers, and if the total number of non-assigned C-numbers belonging to each of the other C-number blocks is equal to or greater than the threshold Tb (YES at Step S308), the BB unit of the base station performs a process as described below. Specifically, the BB unit of the base station returns the C-number block containing only non-assigned C-numbers to the CNT unit (Step S309).

Upon receiving a return of the C-number block containing only non-assigned C-numbers, the CNT unit of the base station transmits a response to the return to the BB unit (Step S310).

Subsequently, the terminal 1 transmits and receives other Messages or the like to and from the base station through the random access procedure, and performs non-CA communication by using the C-number for non-CA (Steps S311 to S316).

Further, when a trigger to perform CA communication occurs (Step S317), the CNT unit of the base station selects a C-number for CA from a C-number block that is not selected by the BB unit among the C-number blocks stored in the C-number storage unit 314 (Step S318). The trigger to perform the CA communication includes an event, such as viewing of moving images, and is appropriately set by a designer or the like of the communication system, for example.

Then, the CNT unit of the base station assigns the selected C-number for CA to the terminal via the BB unit (Steps S319 and S320). The C-number for CA is assigned by using an RRC Reconfiguration transmitted and received at the beginning of communication, for example.

The terminal returns an RRC Reconfiguration Complete, as a response to the RRC Reconfiguration, to the base station, and performs CA communication by using the C-number for CA (Steps S321 and S322).

As described above, in the third embodiment, in execution of CA communication, a C-number for CA is assigned to the terminal 30 from a C-number block that is not selected at the time of non-CA communication among a plurality of C-number blocks. Therefore, according to the third embodiment, as compared to the underlying technology to fix the range of the C-numbers for each cell, it is possible to dynamically distinguish between the C-numbers for non-CA and the C-numbers for CA among the predetermined number of C-numbers, so that it is possible to efficiently prevent deficiency in the C-numbers for each cell. As a result, according to the third embodiment, it is possible to prevent depletion of the C-numbers to be assigned to the terminal 30 when CA communication is performed. Further, according to the third embodiment, it is possible to manage the C-numbers for non-CA and the C-numbers for CA in units of blocks, so that it is possible to prevent depletion of the C-numbers to be assigned to the terminal 30.

[d] Fourth Embodiment

While the embodiments of the communication system and the base station disclosed in the present application have been described above, the disclosed technology may be embodied in various forms other than the above-described embodiments. Modifications of the embodiments will be described below as a fourth embodiment.

In the third embodiment, a case has been described in which conflict between a C-number for non-CA used for non-CA communication and a C-number for CA used for CA communication is acceptable; however, the disclosed technology is not limited to this example. For example, in some cases, an administrator or the like of a communication system may determine, in advance, that conflict between a C-number for non-CA used for non-CA communication and a C-number for CA used for CA communication is not acceptable. In this case, it may be possible to perform a process as described below.

Figure 18:
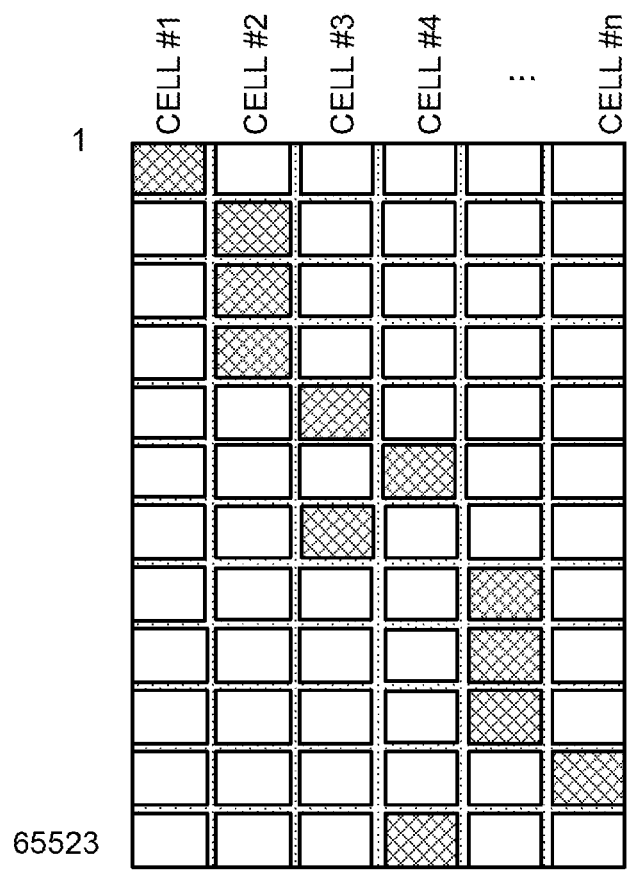
FIG. 18 is a diagram for explaining a C-number assigning method according to a modification of the third embodiment.

FIG. 18 is a diagram for explaining a C-number assigning method according to a modification of the third embodiment. In execution of non-CA communication, the first assigning unit 313 of the base station 310 selects different C-number blocks between a single cell to be used for non-CA communication and the other cells from among the C-number blocks stored in the C-number storage unit 312. In the example in FIG. 18, C-number blocks selected by the first assigning unit 313 are illustrated as black rectangles. Then, the first assigning unit 313 assigns a C-number for non-CA to the terminal 30 from the selected C-number blocks. In execution of CA communication, the second assigning unit 315 suspends assignment of a C-number for CA. In execution of CA communication, the communication control unit 32 of the terminal 30 performs the CA communication by continuously using the C-number for non-CA as the C-number for CA.

Further, in the first to the third embodiments as described above, an example has been described in which the base station assigns a C-number for CA to the terminal, as a C-number common to two or more of all the cells in execution of CA communication; however, disclosed technology is not limited to this example. For example, in some cases, all of the cells of a base station may be divided, in advance, into a plurality of groups, to each of which two or more cells used for CA communication belong. For example, if cells are geographically distant from each other or if it is difficult to perform communication between cells due to an external cause, such as a building, all of the cells of the base station are divided into a plurality of blocks in advance. In this case, it may be possible to perform a process as described below.

Figure 19:
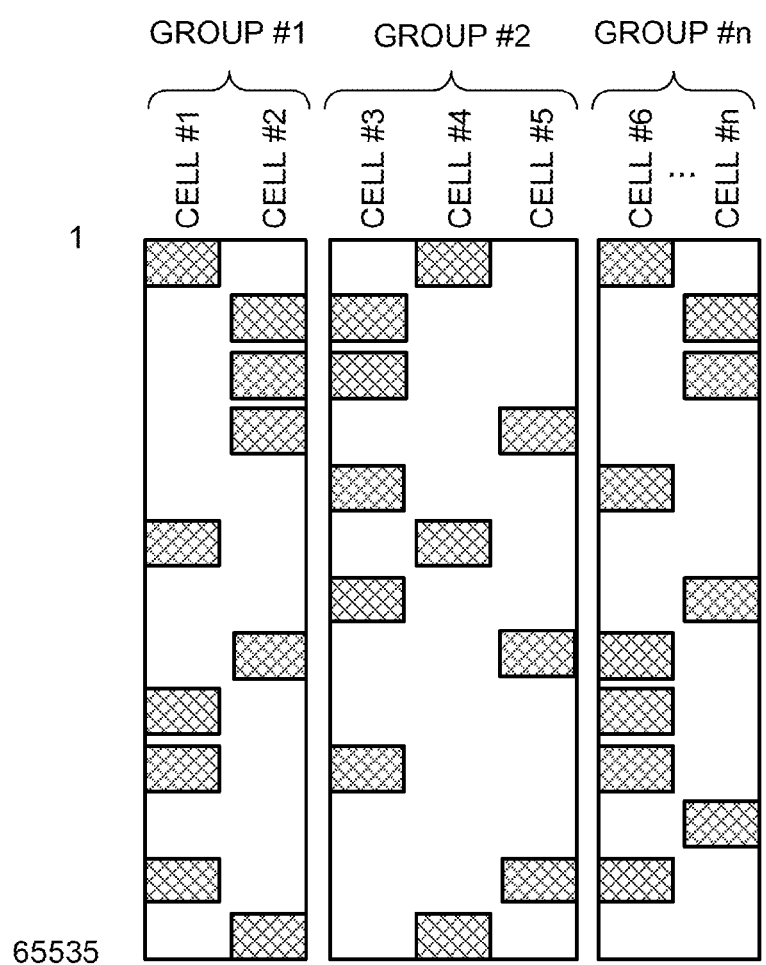
FIG. 19 is a diagram for explaining a C-number assigning method according to a modification of the first embodiment.

FIG. 19 is a diagram for explaining a C-number assigning method according to a modification of the first embodiment. In execution of CA communication, the second assigning unit 15 of the base station 10 assigns, to the terminal 30, a C-number for CA common to two or more cells belonging to each of the groups, from among a predetermined number of C-numbers excluding the C-numbers for non-CA. In the example in FIG. 19, groups #1 to #n are illustrated as a plurality of groups, to each of which two or more cells used for CA communication belong. In this example, the second assigning unit 15 assigns, to the terminal 30, a C-number for CA common to cells #1 and #2 belonging to the group #1. Further, the second assigning unit 15 assigns, to the terminal 30, a C-number for CA common to cells #3 to #5 belonging to the group #2. Furthermore, the second assigning unit 15 assigns, to the terminal 30, a C-number for CA common to cells #6 to #n belonging to the group #n.

Hardware Configuration

The base stations according to the first to the third embodiments are implemented by a hardware configuration as described below.

Figure 20:
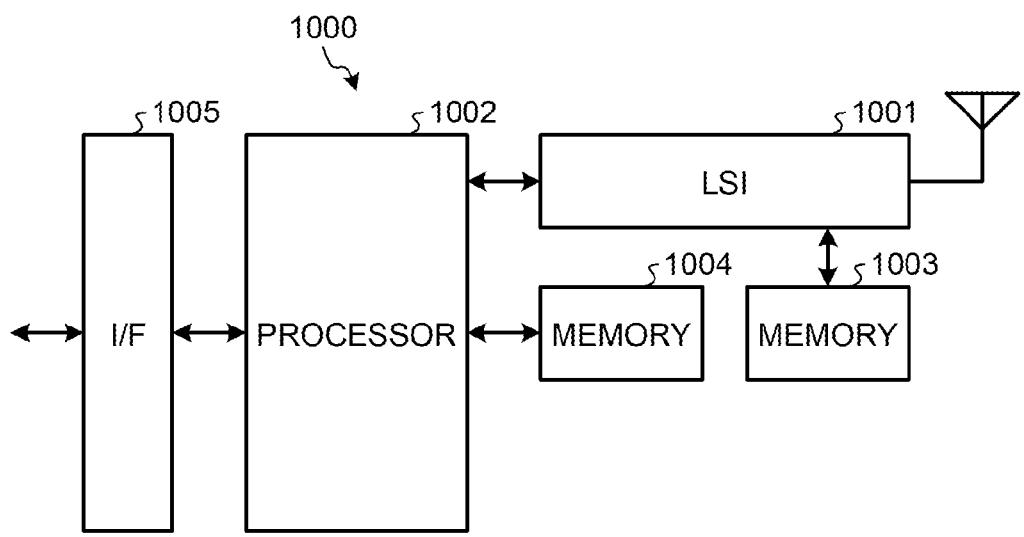
FIG. 20 is a diagram illustrating a hardware configuration of the base station.

FIG. 20 is a diagram illustrating the hardware configuration of the base station. In FIG. 20, a base station 1000 includes a Large Scale Integrated circuit (LSI) 1001, a processor 1002, memories 1003 and 1004, and an Inter/Face (I/F) 1005. The processor 1002 is connected to the LSI 1001, the memory 1004, and the I/F 1005 via a bus. The LSI 1001 is connected to the memory 1003.

The LSI 1001 performs a process related to transmission and reception in the base station 1000. Specifically, the LSI 1001 performs a wireless reception process, a wireless transmission process, and the like. Examples of the processor 1002 include a Central Processing Unit (CPU), a Digital Signal Processor (DSP), and a Field Programmable Gate Array (FPGA). Further, examples of the memories 1003 and 1004 include a Random Access Memory (RAM) such as a Synchronous Dynamic Random Access Memory (SDRAM), a Read Only Memory (ROM), and a flash memory.

Various processing functions implemented by the base station according to the first to the third embodiments may be implemented by causing a processor included in the base station to perform programs stored in various memories, such as a nonvolatile storage medium. Specifically, a program corresponding to each process performed by the BB unit (that is, the first assigning unit 13, the wireless IF unit 11, and the like) may be stored in the memory 1003, and each program may be executed by the LSI 1001. Further, a program corresponding to each process performed by the CNT unit (that is, the second assigning unit 15 and the like) may be stored in the memory 1004, and each program may be executed by the processor 1002.

Figure 21:
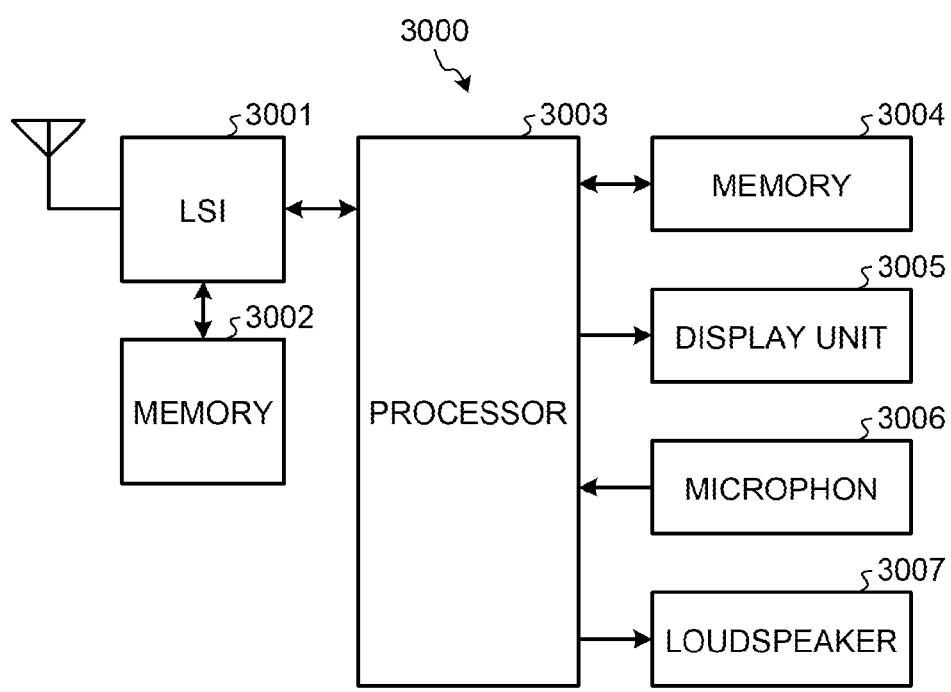
FIG. 21 is a diagram illustrating an example of a hardware configuration of the terminal.

FIG. 21 is a diagram illustrating an example of a hardware configuration of the terminal. In FIG. 21, a terminal 3000 includes an LSI 3001, a processor 3003, memories 3002 and 3004, a display unit 3005, such as a Liquid Crystal Display (LCD), a microphone 3006, and a loudspeaker 3007. The processor 3003 is connected to the LSI 3001, the memory 3004, the display unit 3005, the microphone 3006, and the loudspeaker 3007 via a bus. The LSI 3001 is connected to the memory 3002.

The LSI 3001 performs a process related to transmission and reception in the terminal 3000. Specifically, the LSI 3001 performs a wireless reception process, a wireless transmission process, and the like. Examples of the processor 3003 include a CPU, a DSP, and an FPGA. Further, examples of the memories 3002 and 3004 include a RAM such as an SDRAM, a ROM, and a flash memory.

Various processing functions implemented by the terminal according to the first to the third embodiments may be implemented by causing a processor included in the terminal to perform programs stored in various memories, such as a nonvolatile storage medium. Specifically, a program corresponding to each process performed by the wireless IF unit 31 may be stored in the memory 3002, and each program may be executed by the LSI 3001. Further, a program corresponding to each process performed by the communication control unit 32 may be stored in the memory 3004, and each program may be executed by the processor 3003.

According to an embodiment of the communication system disclosed in the present application, it is possible to prevent depletion of C-RNTI numbers to be assigned to a terminal when CA is performed.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A communication system comprising:
a base station; and
a terminal, wherein
the base station includes a first processor that performs a first process including:
first assigning, in execution of first communication using a single cell of the base station with the terminal, to the terminal, a first Cell-Radio Network Temporary Identifier (C-RNTI) number as a C-RNTI number associated uniquely with the single cell from a predetermined number of C-RNTI numbers for identifying the terminal; and
second assigning, in execution of second communication simultaneously using a plurality of cells with the terminal, to the terminal, a second C-RNTI number as a C-RNTI number associated commonly with the plurality of the cells from the predetermined number of the C-RNTI numbers excluding the first C-RNTI number, and
the terminal includes a second processor that performs a second process including performing the first communication by using the first C-RNTI number assigned by the base station, or performing the second communication by using the second C-RNTI number assigned by the base station, wherein
the predetermined number of the C-RNTI numbers are divided, in advance, into a first C-RNTI number group containing C-RNTI numbers including the first C-RNTI number and a second C-RNTI number group containing C-RNTI numbers including the second C-RNTI number,
the base station further includes:
a first storage that stores therein the first C-RNTI number group; and
a second storage that stores therein the second C-RNTI number group,
the first assigning includes assigning, in execution of the first communication, the first C-RNTI number to the terminal from the first C-RNTI number group stored in the first storage unit, and
the second assigning includes assigning, in execution of the second communication, the second C-RNTI number to the terminal from the second C-RNTI number group stored in the second storage unit.

2. A communication system comprising:
a base station; and
a terminal, wherein
the base station includes a first processor that performs a first process including:
first assigning, in execution of first communication using a single cell of the base station with the terminal, to the terminal, a first Cell-Radio Network Temporary Identifier (C-RNTI) number as a C-RNTI number associated uniquely with the single cell from a predetermined number of C-RNTI numbers for identifying the terminal; and
second assigning, in execution of second communication simultaneously using a plurality of cells with the terminal, to the terminal, a second C-RNTI number as a C-RNTI number associated commonly with the plurality of the cells from the predetermined number of the C-RNTI numbers excluding the first C-RNTI number, and
the terminal includes a second processor that performs a second process including performing the first communication by using the first C-RNTI number assigned by the base station, or performing the second communication by using the second C-RNTI number assigned by the base station, wherein
the base station further includes a first storage and a second storage, each of which stores therein the predetermined number of the C-RNTI numbers,
the first assigning includes assigning, in execution of the first communication, in ascending order, the first C-RNTI number to the terminal from the predetermined number of the C-RNTI numbers stored in the first storage, and
the second assigning includes assigning, in execution of the second communication, in descending order, the second C-RNTI number to the terminal from C-RNTI numbers that are not assigned as the first C-RNTI numbers by the first assigning unit among the predetermined number of the C-RNTI numbers stored in the second storage.

3. The communication system according to claim 2, wherein
the second assigning further includes suspending, when the predetermined number of the C-RNTI numbers stored in the second storage unit do not include an C-RNTI number that is not assigned as the first C-RNTI number, assignment of the second C-RNTI number, and
upon suspension of the assignment of the second C-RNTI number, the performing further includes continuing the first communication by using the first C-RNTI number.

4. A communication system comprising:
a base station; and
a terminal, wherein
the base station includes a first processor that performs a first process including:
first assigning, in execution of first communication using a single cell of the base station with the terminal, to the terminal, a first Cell-Radio Network Temporary Identifier (C-RNTI) number as a C-RNTI number associated uniquely with the single cell from a predetermined number of C-RNTI numbers for identifying the terminal; and
second assigning, in execution of second communication simultaneously using a plurality of cells with the terminal, to the terminal, a second C-RNTI number as a C-RNTI number associated commonly with the plurality of the cells from the predetermined number of the C-RNTI numbers excluding the first C-RNTI number, and
the terminal includes a second processor that performs a second process including performing the first communication by using the first C-RNTI number assigned by the base station, or performing the second communication by using the second C-RNTI number assigned by the base station, wherein
the base station further includes a first storage and a second storage, each of which stores therein C-RNTI numbers belonging to each of C-RNTI number blocks that are obtained by dividing the predetermined number of the C-RNTI numbers into a predetermined number of blocks, in association with each of the C-RNTI number blocks,
the first assigning further includes selecting, in execution of the first communication, in ascending order, an C-RNTI number block from the C-RNTI number blocks stored in the first storage, and assigning the first C-RNTI number to the terminal from the selected C-RNTI number block, and the second assigning includes assigning, in execution of the second communication, the second C-RNTI number to the terminal from an C-RNTI number block that is not selected at the first assigning among the C-RNTI number blocks stored in the second storage unit.

5. The communication system according to claim 4, wherein after assignment of the first C-RNTI number to the terminal, if a total number of C-RNTI numbers that are not assigned as the first C-RNTI numbers among the C-RNTI numbers belonging to each of the C-RNTI number blocks stored in the first storage is equal to or smaller than a threshold, the first assigning further includes requesting to provide an unused C-RNTI number block among the C-RNTI number blocks stored in the second storage, and the second assigning further incudes providing the unused C-RNTI number block in response to the requesting at the first assigning.

6. The communication system according to claim 5, wherein after assignment of the first C-RNTI number to the terminal, when the C-RNTI number blocks stored in the first storage include an C-RNTI number block containing only non-assigned C-RNTI numbers and if a total number of C-RNTI numbers that are not assigned as the first C-RNTI numbers among the C-RNTI numbers belonging to each of the other C-RNTI number blocks is equal to or greater than a threshold, the first assigning further includes returning the C-RNTI number block containing only the non-assigned C-RNTI numbers.

7. The communication system according to claim 4, wherein it is determined, in advance, that conflict between the first C-RNTI number used for the first communication and the second C-RNTI number used for the second communication is not acceptable, the first assigning further includes selecting, in execution of the first communication, different C-RNTI number blocks between the single cell used for the first communication and cells other than the single cell from among the C-RNTI number blocks stored in the first storage, and assigning the first C-RNTI number to the terminal from the selected C-RNTI number blocks, the second assigning further includes suspending, in execution of the second communication, assignment of the second C-RNTI number, and the performing includes performing, in execution of the second communication, the second communication by continuously using the first C-RNTI number as the second C-RNTI number.

8. The communication system according to claim 1, wherein the plurality of the cells are divided, in advance, into a plurality of groups, to each of which the plurality of the cells used for the second communication belong, and the second assigning includes assigning, in execution of the second communication, the second C-RNTI number common to the plurality of the cells belonging to each of the groups to the terminal from the predetermined number of the C-RNTI numbers excluding the first C-RNTI number.

* * * * *